(12) United States Patent
Zhang

(10) Patent No.: US 10,687,013 B2
(45) Date of Patent: Jun. 16, 2020

(54) PROXY-PATTERN-BASED MULTIMEDIA DISPLAYING METHOD, DEVICE AND APPARATUS

(71) Applicant: AutoChips Inc., Hefei (CN)

(72) Inventor: Shuhui Zhang, Hefei (CN)

(73) Assignee: AutoChips Inc., Heifei (CN)

( * ) Notice: Subject to any disclaimer, the term of this patent is extended or adjusted under 35 U.S.C. 154(b) by 0 days.

(21) Appl. No.: 16/166,189

(22) Filed: Oct. 22, 2018

(65) Prior Publication Data

US 2019/0306450 A1 Oct. 3, 2019

(30) Foreign Application Priority Data

Mar. 30, 2018 (CN) .......................... 2018 1 0278774

(51) Int. Cl.
 *H04N 5/445* (2011.01)
(52) U.S. Cl.
 CPC .................. *H04N 5/44513* (2013.01); *H04N 2005/44526* (2013.01)
(58) Field of Classification Search
 CPC ............... H04N 5/44513; H04N 21/43; H04N 2005/44526; G09G 5/00
 See application file for complete search history.

(56) References Cited

U.S. PATENT DOCUMENTS

| | | | | |
|---|---|---|---|---|
| 2007/0294333 A1* | 12/2007 | Yang | .............. | H04N 21/234327 709/203 |
| 2008/0187286 A1* | 8/2008 | Chung | ..................... | H04N 5/85 386/254 |
| 2009/0210482 A1* | 8/2009 | Wynn | ................. | G06F 9/44526 709/203 |
| 2015/0193285 A1* | 7/2015 | Hamzata | ............. | G06F 9/45533 719/313 |
| 2018/0129467 A1* | 5/2018 | Gage | ..................... | G06F 3/1454 |

\* cited by examiner

*Primary Examiner* — Charles E Anya

(57) ABSTRACT

A proxy-pattern-based multimedia displaying method is disclosed in the present disclosure, the multimedia displaying method is applied to a chip where an embedded system is built in. The embedded system includes a display application layer, a surface proxy body, a surface entrusting body and a surface realizing component. The surface proxy body is an proxy for the surface entrusting body. The surface proxy body and the surface entrusting body are independent of the display application layer. The multimedia displaying method includes: receiving to-be-displayed multimedia data from the display application layer and sending the to-be-displayed multimedia data to the surface entrusting body by the surface proxy body; and sending the to-be-displayed multimedia data to the surface realizing component or the display application layer for display on a display screen by the surface entrusting body.

19 Claims, 24 Drawing Sheets

PROXY-PATTERN-BASED MULTIMEDIA DISPLAYING METHOD, DEVICE AND APPARATUS

CROSS REFERENCE TO RELATED APPLICATIONS

This application claims priorities to Chinese Patent Application No. 201810278774.9, filed on Mar. 30, 2018 in the State Intellectual Property Office of China, the contents of which are herein incorporated by reference in their entireties.

TECHNICAL FIELD

The present disclosure generally relates to the technical field of displaying, and more particularly, to a proxy-pattern-based multimedia displaying method, device and a readable storage medium.

BACKGROUND

An operating system generally comprises a surface realizing component (which comprises a display drive or a display system) therein to provide a uniform interface for accessing video apparatuses/drives at a lower level by a surface application program at an upper level. The surface application program may call the surface realizing component to realize the display of contents such as videos, pictures and subtitle. For a file that needs to be decoded, the application program may assign the file to a middleware (e.g., a play framework, a picture display framework or the like) to be decoded by the middleware and then the decoded file is displayed by calling the surface realizing component.

In the prior art, a display application layer (the surface application program and/or the middleware) directly calls the surface realizing component. For example, in a Linux system, a drive program V412 provides a set of interface specifications for video apparatus programs under Linux. Chip manufacturers can achieve the interface of a V412 drive and a display apparatus according to the interface definition. The display application layer can achieve the display of videos, subtitle and pictures or the like by calling a Video-associated interface of the V412 drive. A display control part in the display application layer needs to directly interface with the surface realizing component. If the surface realizing component needs to be replaced, or interfaces/ parameter configuration of the surface realizing component vary (e.g., being implanted onto different chips), then the display application layer needs to be modified with a high complexity and a poor flexibility.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

The present disclosure will be described in detail with reference to attached drawings and embodiments hereinafter. Contents not conflicting in the following embodiments may be combined with each other.

Figure 1:
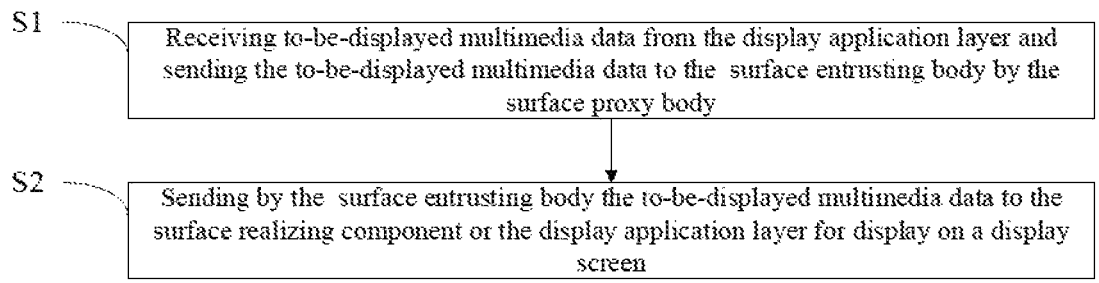
FIG. 1 is a schematic flowchart diagram of an embodiment of a proxy-pattern-based multimedia displaying method according to the present disclosure.

As shown in FIG. 1, an embodiment of a proxy-pattern-based multimedia displaying method according to the present disclosure comprises:

S1: receiving to-be-displayed multimedia data from the display application layer and sending the to-be-displayed multimedia data to the surface entrusting body by the surface proxy body.

This embodiment is applied to a chip where an embedded system is built in, e.g., a vehicle-mounted display chip where a Linux system is built in. The embedded system comprises a display application layer, a surface proxy body, a surface entrusting body and a surface realizing component. The display application layer comprises a surface application program and/or a middleware, and the surface realizing component comprises a display drive or a display system. The surface proxy body and the surface entrusting body are independent of the display application layer.

The surface application program may be an application program that requires the display function, e.g., a video playing application, a picture browsing application or the like. Contents to be displayed (videos/subtitle/pictures or the like) may be encoded by a certain kind of encoding manner, so the surface application program may need to decode the encoded contents before displaying the encoded contents. The decoding operation may be accomplished by the surface application program itself or be accomplished by calling a middleware. For video files, in addition to being decoded, the video files also need to be divided so as to separate video streams, audio streams and possibly included subtitle streams from each other. Similarly the dividing may also be accomplished by the surface application program itself or be accomplished by calling a middleware. The middleware may comprise at least one of a play framework, a picture display framework or the like.

The play framework (e.g., Gstreamer, DirectShow, ffmpeg or the like) may be construed as a software platform, and a set of intuitive and compact API interfaces are designed on the platform. The upper-level application program can transparently use functions provided by the software platform through these interfaces, e.g., file dividing, parsing, encoding and decoding or the like.

The surface proxy body provides a plurality of interfaces, that can be used for realizing the display function, to be called by the display application layer, but the surface proxy body itself does not have the display function, and the actual display function is realized by the surface entrusting body. To realize the display function, the surface entrusting body needs to interface with the surface realizing component, or the surface entrusting body comprises the surface realizing component so as to internally interface with the surface realizing component. The surface proxy body, as the proxy of the surface entrusting body, is mainly responsible for interaction of data and control commands between the display application layer and the surface entrusting body.

Optionally, before this step, the surface proxy body may receive configuration information from the display application layer and forward the configuration information to the surface entrusting body. The transmission of the configuration information may be accomplished at one time or at least at two times. The configuration information comprises at least one of a selected format, resolution, buffer information, destination information and priority. The buffer information comprises formats of the buffers and/or the count of the buffers, and the destination information comprises at least one of a destination position, a destination width, and a destination height.

Default values of part or all of the configuration information may be agreed upon in advance between the display application layer and the surface entrusting body/surface realizing component. If the values of some kinds of configuration information determined by the display application layer are the default values, then these kinds of configuration information may be selected to be omitted during the configuration process.

Optionally, before the transmission of the configuration information, the display application layer may acquire supported attribute information of the surface SDK through the surface proxy body, and the supported attribute information comprises a set of formats supported and/or a set of characters supported. Generally speaking, the set of formats supported is for displayed contents of a picture attribute, e.g., videos, pictures, subtitle in a picture form or the like; and the set of characters supported is for displayed contents of a text attribute, e.g., characters, subtitle in a text form or the like. Additionally, the supported attribute information may also comprise supported information of priority, supported information of multiplex displaying or the like.

The to-be-displayed multimedia data may comprise at least one of subtitle, decoded picture data, and decoded video data. The to-be-displayed multimedia data being transmitted may be itself or a buffer filled with the to-be-displayed multimedia data by the display application layer.

Figure 2:
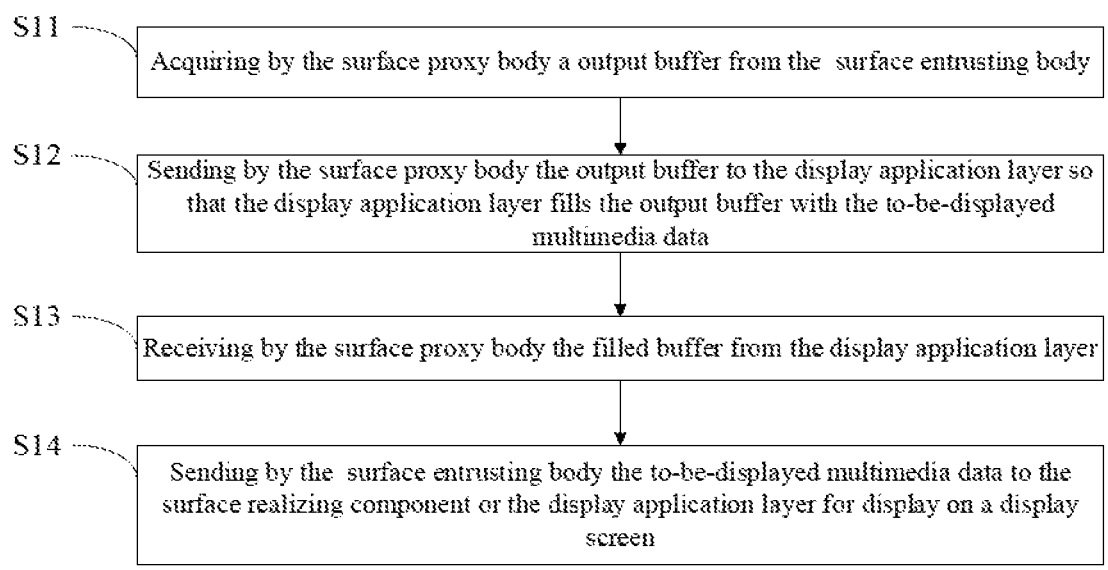
FIG. 2 is a schematic flowchart diagram of S1 in the case where to-be-displayed multimedia data is transmitted in the form of a buffer in an embodiment of the proxy-pattern-based multimedia displaying method according to the present disclosure.

As shown in FIG. 2, if the to-be-displayed multimedia data is transmitted in the form of a buffer, then S1 may specifically comprise:

S11: acquiring by the surface proxy body a output buffer from the surface entrusting body.

S12: sending by the surface proxy body the output buffer to the display application layer so that the display application layer fills the output buffer with the to-be-displayed multimedia data.

If the to-be-displayed multimedia data comprises text subtitle, i.e., subtitle in the text form, then the display application layer first needs to convert the text subtitle into subtitle of a picture form and then fills the output buffer with the to-be-displayed multimedia data.

S13: receiving by the surface proxy body the filled buffer from the display application layer.

S14: sending by the surface proxy body the filled buffer to the surface entrusting body.

According to the actual architecture of the surface entrusting body, the surface proxy body may send the filled buffer to a surface realization or a surface client.

The surface entrusting body/surface realizing component may read data in the filled buffer for display, and the buffer becomes free again after the reading/displaying is finished.

S2: sending by the surface entrusting body the to-be-displayed multimedia data to the surface realizing component or the display application layer for display on a display screen.

Generally speaking, the surface entrusting body may call the surface realizing component to plot the to-be-displayed multimedia data, thereby realizing the display of the to-be-displayed multimedia data on the display screen. In some embodiments, the surface entrusting body may call other programs to display the to-be-displayed multimedia data. For example, when the to-be-displayed multimedia data comprises the subtitle, the surface entrusting body may call a function provided by the surface application program to plot the subtitle.

Through the implementation of this embodiment, the display application layer receives the to-be-displayed multimedia data from the display application layer and sends the to-be-displayed multimedia data to the surface entrusting body through the surface proxy body; the surface entrusting body sends the to-be-displayed multimedia data to the surface realizing component or the display application layer for display on a display screen. It is the surface entrusting body that interfaces with the surface realizing component or the display application layer to realize the display function, the surface proxy body is a proxy for the surface entrusting body, the display application layer indirectly calls the surface entrusting body through the surface proxy body and does not interface with the surface entrusting body directly and thus does not interface with the surface realizing component directly. Therefore, even if the surface realizing component varies, e.g., being implanted to different chips, it is unnecessary to modify the display application layer, thereby reducing the complexity of the display application layer and improving the flexibility of the display application layer.

Figure 3:
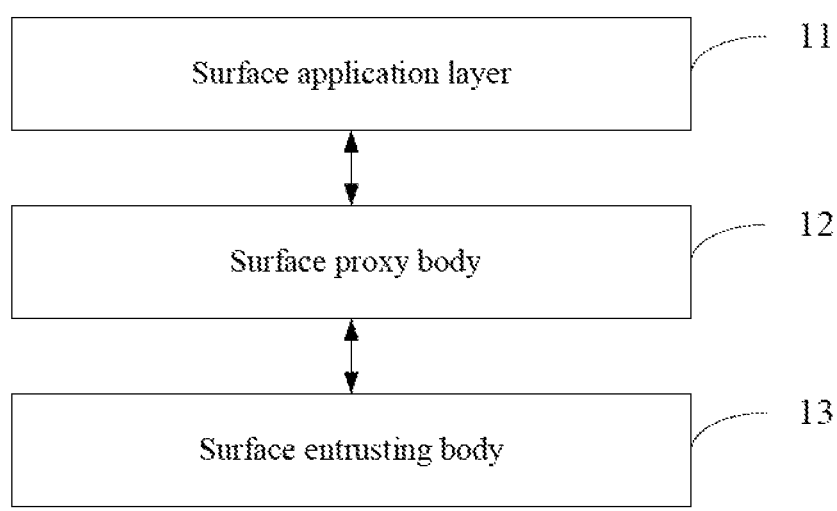
FIG. 3 is a schematic view illustrating the overall architecture in an embodiment of the proxy-pattern-based multimedia displaying method according to the present disclosure.

An overall architecture of this embodiment is as shown in FIG. 3, and a display application layer 11 calls a surface entrusting body 13 through a surface proxy body 12. Because the display application layer 11 does not directly interface with the surface entrusting body 13, the surface entrusting body 13 actually realizing the display function may be of a client/server (CS) architecture. Depending on whether the surface entrusting body 13 is of a CS architecture and whether the surface entrusting body 13 comprises the surface realizing component therein, the overall architecture shown in FIG. 3 may be divided into four categories, which will be described with reference to attached drawings hereinafter.

Figure 4:
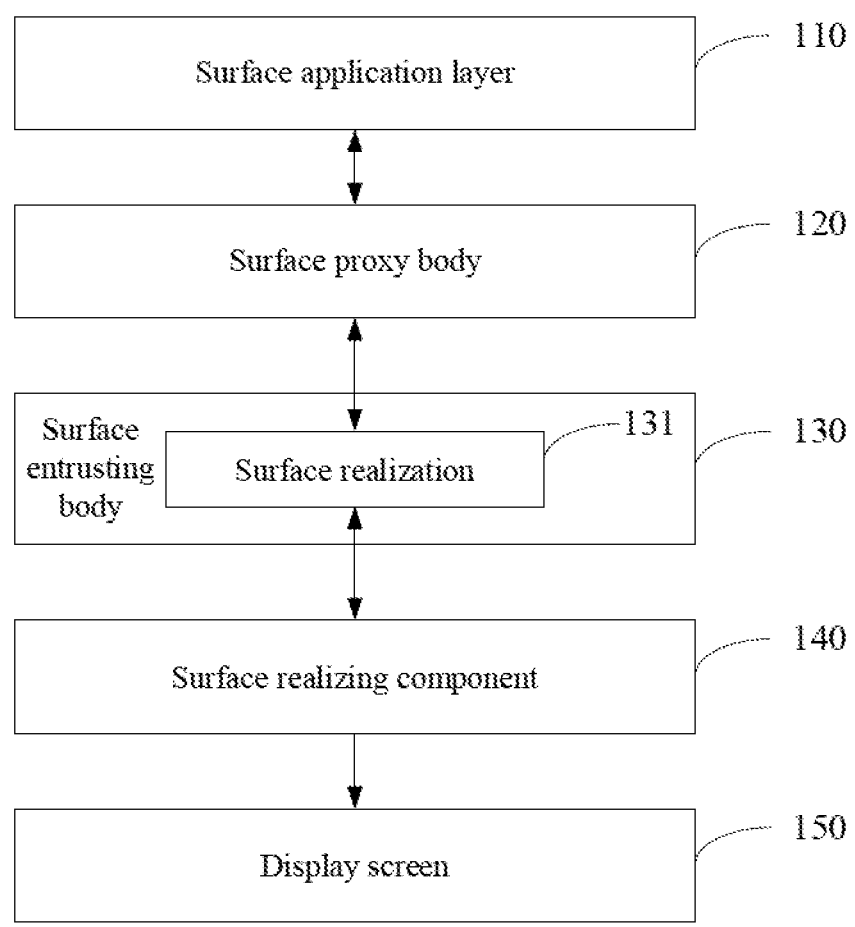
FIG. 4 is a schematic view illustrating the overall architecture in the case where a surface entrusting body is of a non-CS architecture and does not comprise a surface realizing component in an embodiment of the proxy-pattern-based multimedia displaying method according to the present disclosure.

In the case where the surface entrusting body is of a non-CS architecture and does not comprise the surface realizing component, the overall architecture is as shown in FIG. 4, wherein a surface entrusting body 130 comprises a surface realization 131, and the surface realization 131 is configured to interface with a surface realizing component 140 to realize the display function. Specifically, the surface realization 131 may send the to-be-displayed multimedia data from a surface proxy body 120 to a surface realizing component 140 so that the surface realizing component 140 controls a display screen 150 to display the to-be-displayed multimedia data. Optionally, the surface entrusting body 130 and the surface proxy body 120 may belong to the same process as a display application layer 110.

Figure 5:
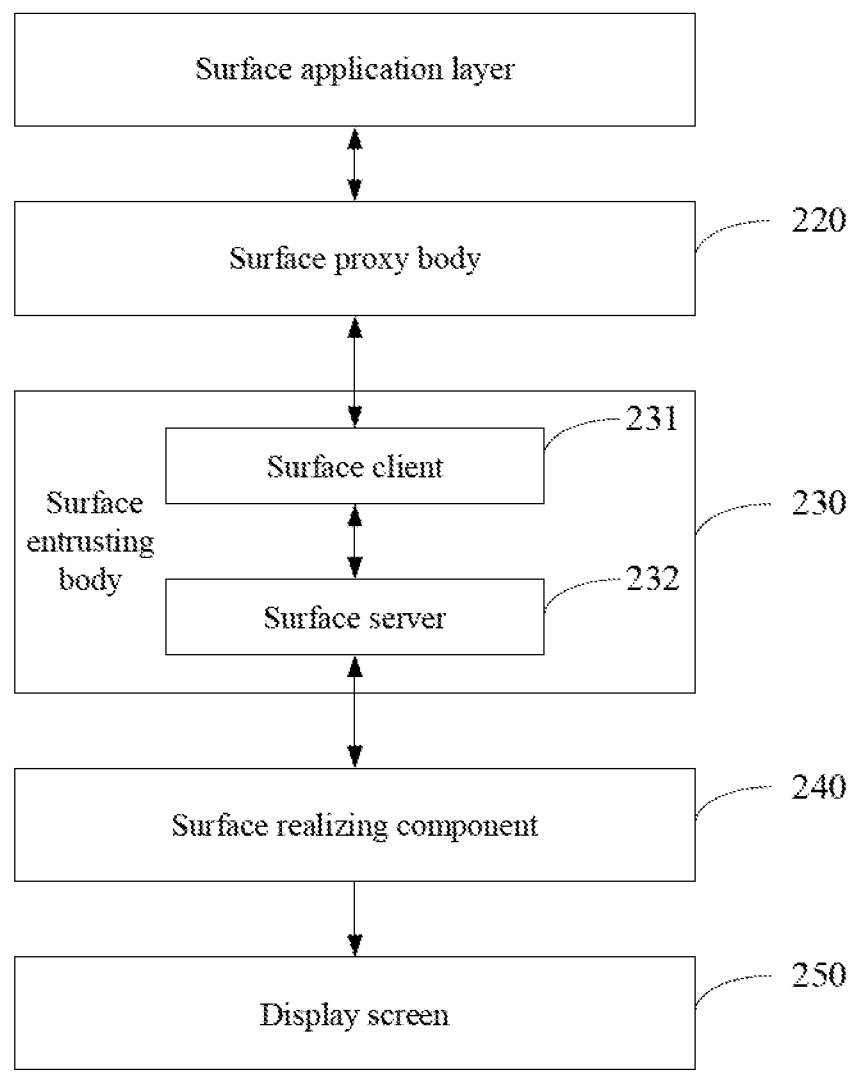
FIG. 5 is a schematic view illustrating the overall architecture in the case where the surface entrusting body is of a CS architecture and does not comprise the surface realizing component in an embodiment of the proxy-pattern-based multimedia displaying method according to the present disclosure.

In the case where the surface entrusting body is the CS architecture and does not comprise the surface realizing component, the overall architecture is as shown in FIG. 5, wherein a surface entrusting body 230 comprises a surface client 231 and a surface server 232, and the surface server 232 is configured to interface with a surface realizing component 240 to realize the display function, and the surface client 231 is configured to interface with a surface proxy body 220. Specifically, the surface client 231 may send the to-be-displayed multimedia data from the surface proxy body 220 to the surface server 232, and the surface server 232 may send the received to-be-displayed multimedia data to the surface realizing component 240 so that the surface realizing component 240 controls a display screen 250 to display the to-be-displayed multimedia data. Optionally, the surface client 231 and the surface server 232 may belong to different processes, and interact with each other through inter-process communication.

Figure 6:
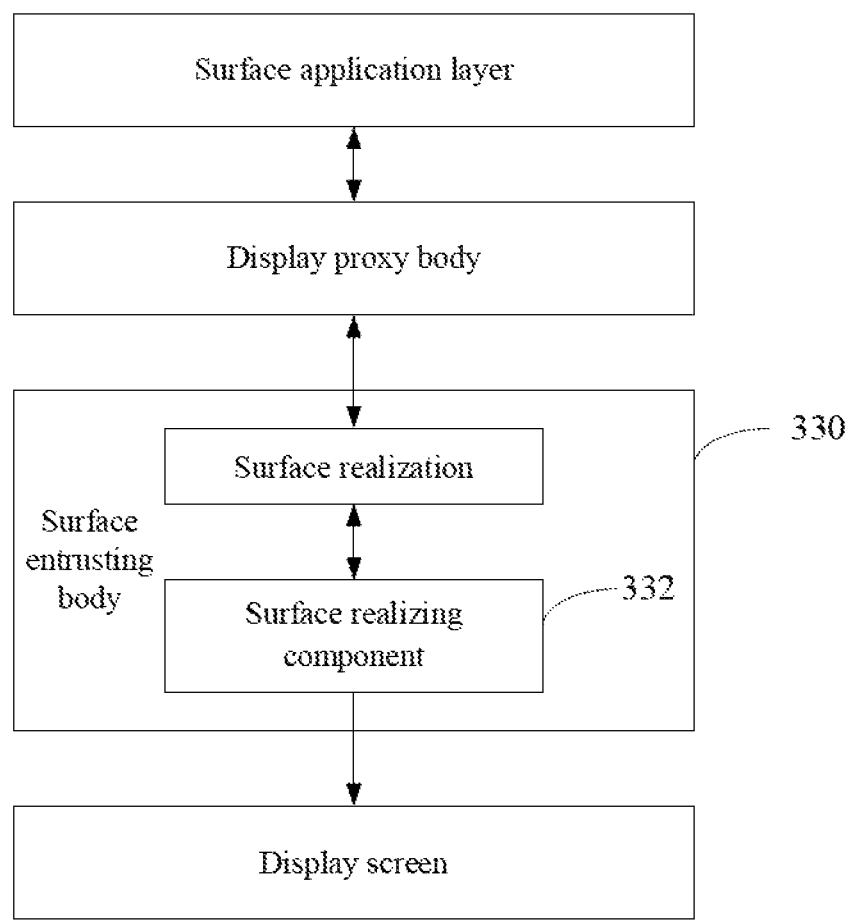
FIG. 6 is a schematic view illustrating the overall architecture in the case where the surface entrusting body is of a non-CS architecture and comprises the surface realizing component in an embodiment of the proxy-pattern-based multimedia displaying method according to the present disclosure.

In the case where the surface entrusting body is the non-CS architecture and comprises the surface realizing component, the overall architecture is as shown in FIG. 6, and the architecture differs from the architecture shown in FIG. 4 in that: a surface entrusting body 330 further comprises a surface realizing component 332, and reference may be made to the above corresponding description for specific contents thereof.

Figure 7:
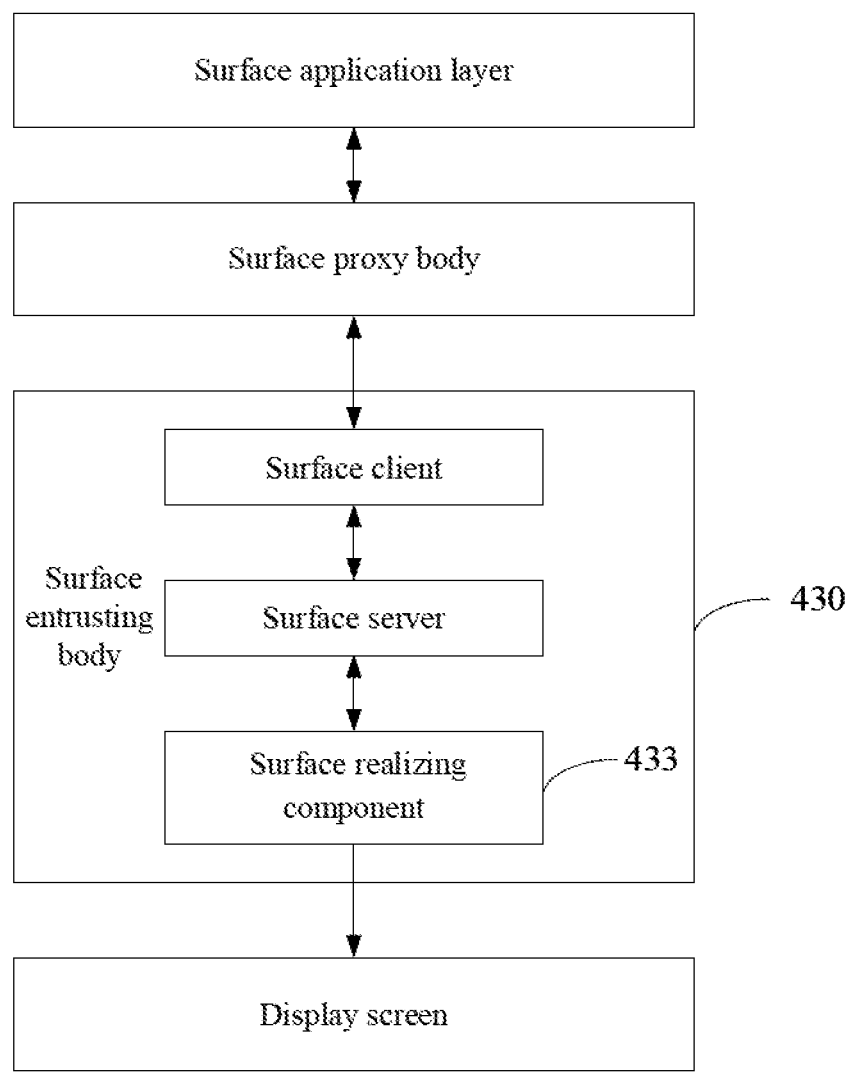
FIG. 7 is a schematic view illustrating the overall architecture in the case where the surface entrusting body is of a CS architecture and comprises the surface realizing component in an embodiment of the proxy-pattern-based multimedia displaying method according to the present disclosure.

In the case where the surface entrusting body is the CS architecture and comprises the surface realizing component, the overall architecture is as shown in FIG. 7, and the architecture differs from the architecture shown in FIG. 5 in that: a surface entrusting body 430 further comprises a surface realizing component 433, and reference may be made to the above corresponding description for specific contents thereof.

If the number of surface application programs and/or display screens that require displaying at the same time is greater than one (which is called multiplex displaying for short), each surface application program corresponds to one surface proxy body, and for the surface entrusting body, each surface application program needs to correspond to one surface realization respectively under the non-CS architecture, each surface application program needs to correspond to one surface client respectively under the CS architecture, each surface client corresponds to one surface object respectively in the surface server, and the surface server manages all the surface objects. For the non-CS architecture, the surface realization directly interfaces with the surface realizing component, so the control of multiplex displaying needs to be accomplished by the surface realizing component, which increases the complexity of the surface realizing component and makes it hard to control the surface realizing component. For the CS architecture, the surface server manages all the surface objects and is capable of acquiring the configuration information and to-be-displayed multimedia data of each surface object, thereby determining whether to display and how to display the to-be-displayed multimedia data of each surface object and accomplishing the control of multiplex displaying. Because the control of multiplex displaying is accomplished by the surface server rather than by the surface realizing component under the CS architecture, it is unnecessary to use complex surface realizing component and the processing of multiplex displaying is more convenient than that under the non-CS architecture.

Specifically, multiplex displaying may be divided into multiple cases depending on the number of the surface application programs and the display screens as well as displaying need of the surface application programs, and examples thereof will be illustrated with reference to the attached drawings hereinafter.

Figure 8:
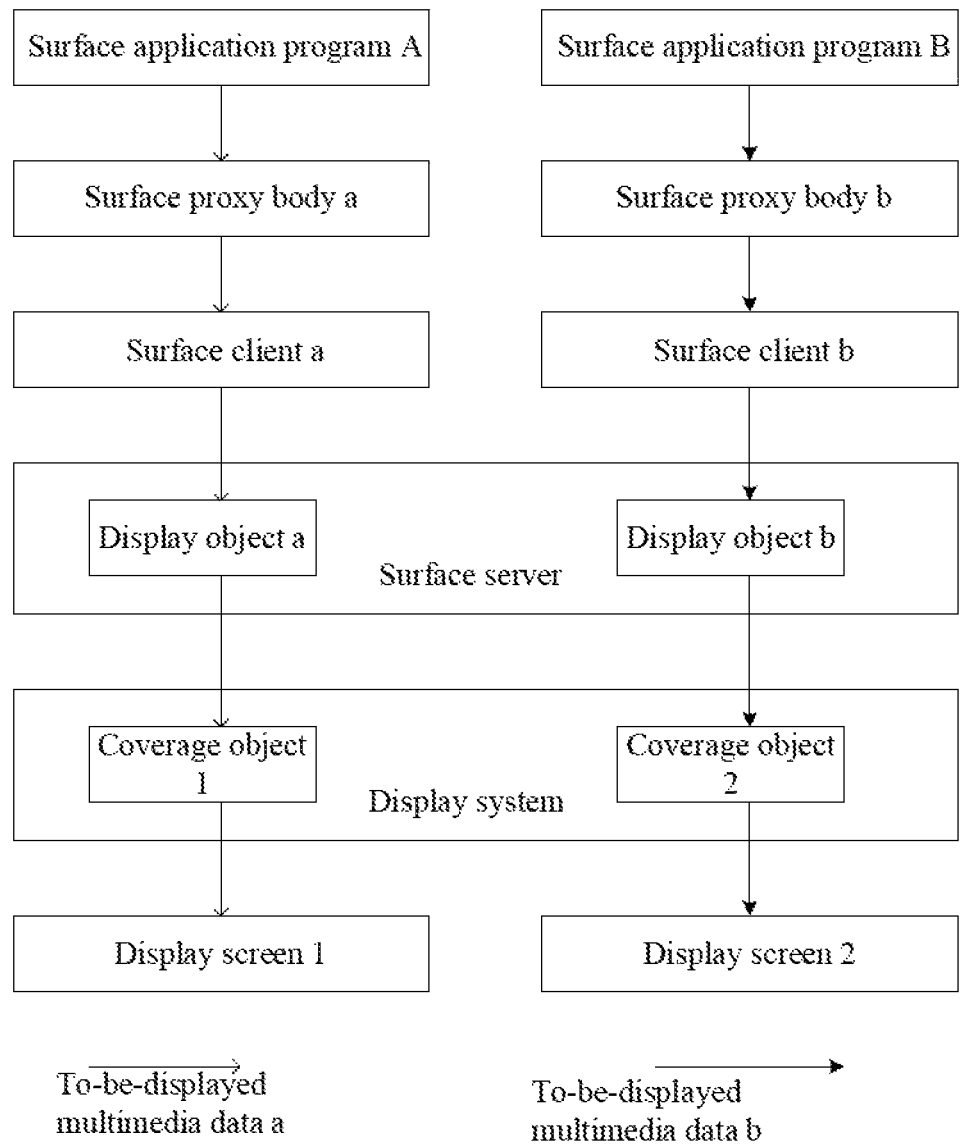
FIG. 8 is a schematic view illustrating that one surface application program corresponds to one display screen in an embodiment of the proxy-pattern-based multimedia displaying method according to the present disclosure.

One case is that one surface application program corresponds to one display screen for display. For example, referring to FIG. 8, a surface application program A sends to-be-displayed multimedia data a to a surface object a in the surface server through a surface proxy body a and a surface client a, a surface application program B sends to-be-displayed multimedia data b to a surface object b in the surface server through a surface proxy body b and a surface client b, the surface server sends the to-be-displayed multimedia data a to a coverage object 1 (corresponding to a display screen 1) in the display system for display on the display screen 1, and sends the to-be-displayed multimedia data b to a coverage object 2 (corresponding to a display screen 2) in the display system for display on the display screen 2.

Figure 9:
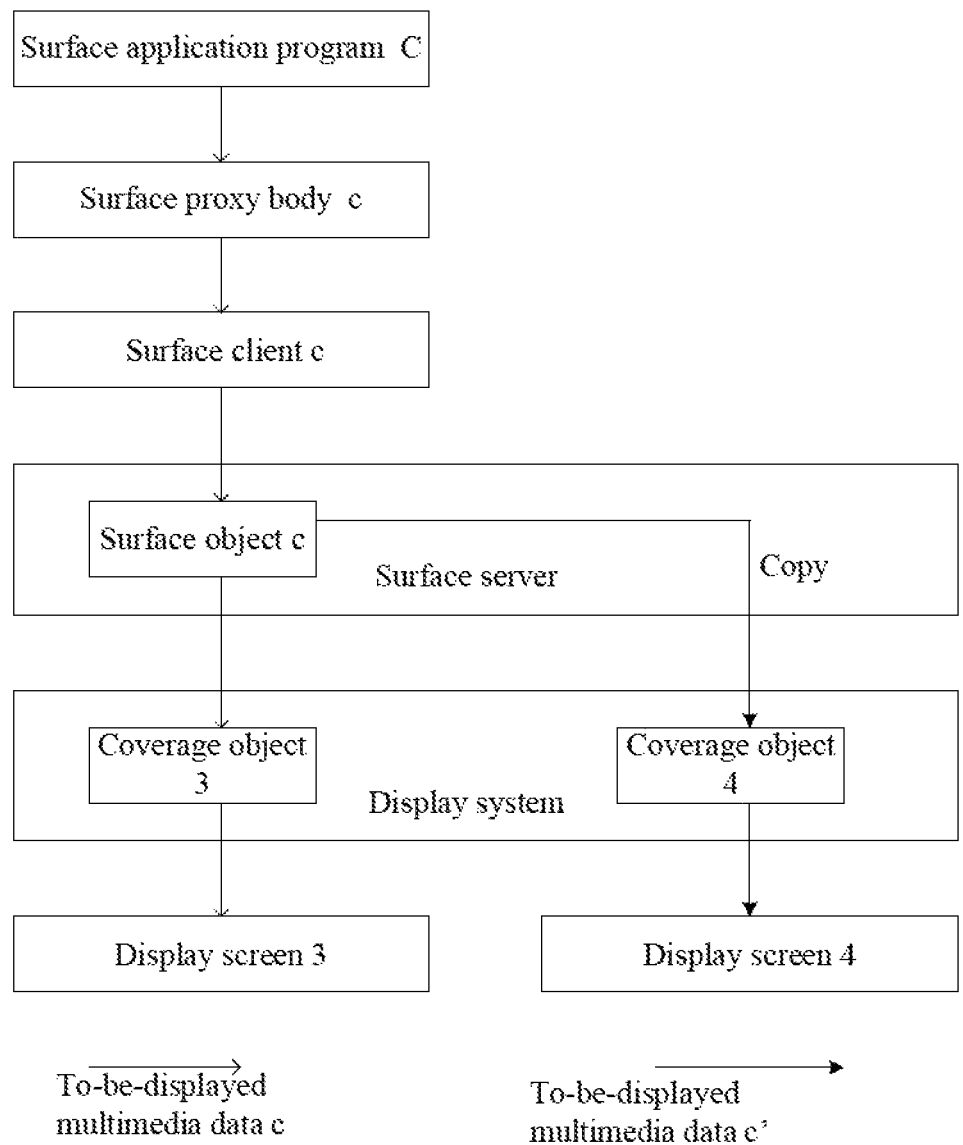
FIG. 9 is a schematic view illustrating that to-be-displayed multimedia data from one surface application program is displayed on two corresponding display screens simultaneously in an embodiment of the proxy-pattern-based multimedia displaying method according to the present disclosure.

Another case is that one surface application program respectively corresponds to at least two display screens for display, i.e., the to-be-displayed multimedia data from one surface application program is displayed on at least two corresponding display screens simultaneously, and this need may be satisfied by copying the to-be-displayed multimedia data. For example, referring to FIG. 9, a surface application program C sends to-be-displayed multimedia data c to a surface object c in the surface server through a surface proxy body c and a surface client c, the surface server copies the to-be-displayed multimedia data c to obtain to-be-displayed multimedia data c', sends the to-be-displayed multimedia data c to a coverage object 3 (corresponding to a display screen 3) in the display system for display on the display screen 3, and sends the to-be-displayed multimedia data c' to a coverage object 4 (corresponding to a display screen 4) in the display system for display on the display screen 4.

Figure 10:
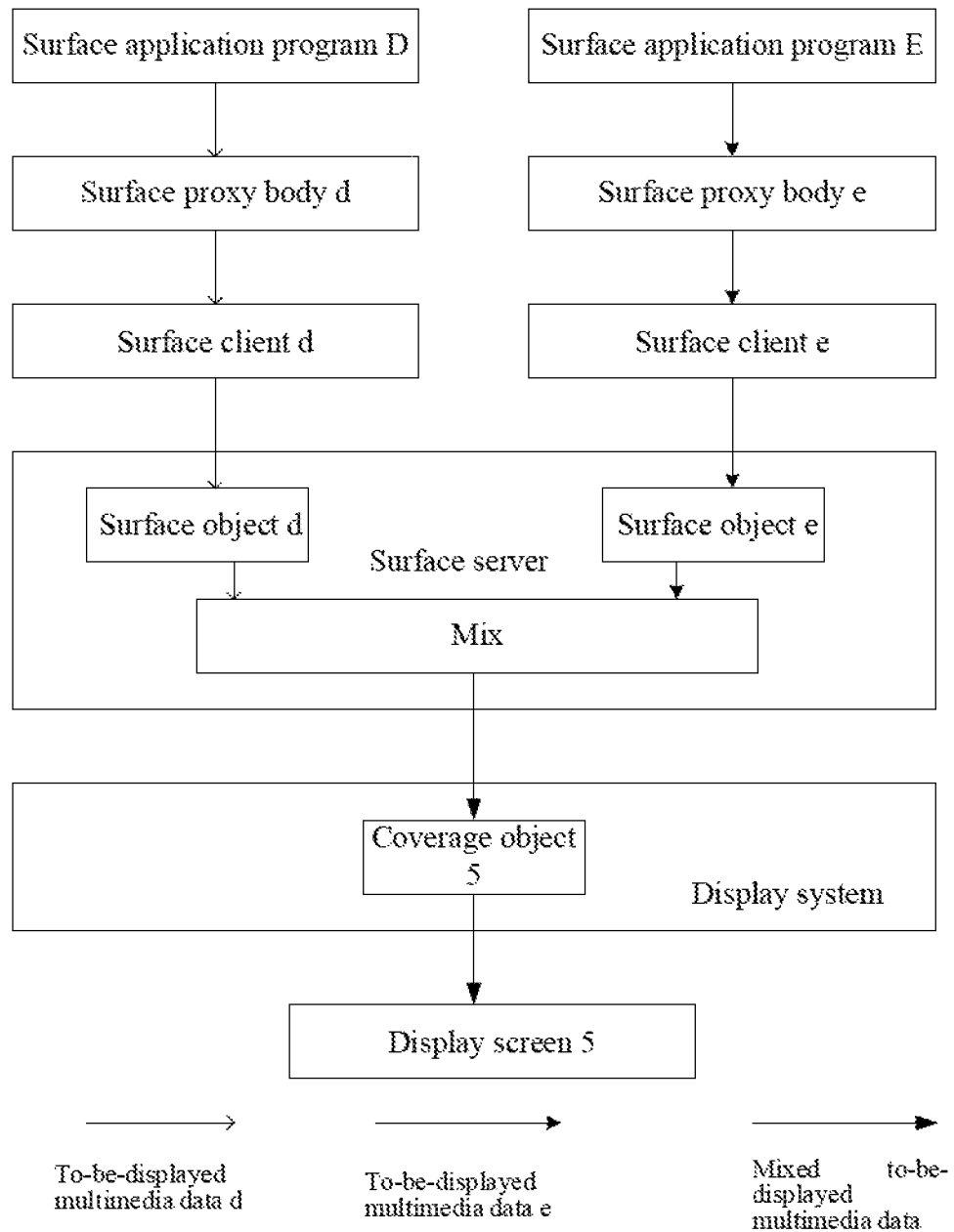
FIG. 10 is a schematic view illustrating that to-be-displayed multimedia data from two surface application programs is displayed on one corresponding display screen simultaneously in an embodiment of the proxy-pattern-based multimedia displaying method according to the present disclosure.

Yet another case is that at least two surface application programs correspond to one display screen, i.e., the to-be-displayed multimedia data from two surface application programs is displayed on one corresponding display screen simultaneously, and this need may be satisfied by mixing the to-be-displayed multimedia data. For example, referring to FIG. 10, a surface application program D sends to-be-displayed multimedia data d to a surface object d in the surface server through a surface proxy body d and a surface client d, a surface application program E sends to-be-displayed multimedia data e to a surface object e in the surface server through a surface proxy body e and a surface client e, and the surface server mixes and sends the to-be-displayed multimedia data d and the to-be-displayed multimedia data e to a coverage object 5 (corresponding to a display screen 5) in the display system for simultaneous display on the display screen 5.

In the ideal case, destinations occupied by the to-be-displayed multimedia data d and the to-be-displayed multimedia data e are not overlapped with each other and the two destinations can be displayed completely at the same time. But actually, the two destinations may be overlapped with each other, and in this case, which destination is at the front (i.e., displayed at the overlapped portion) and which destination is at the back (i.e., not displayed at the overlapped portion) may be determined by the surface server, e.g., determined depending on the priority of the surface application programs D and E, and the destination of a higher priority is at the front.

Figure 11:
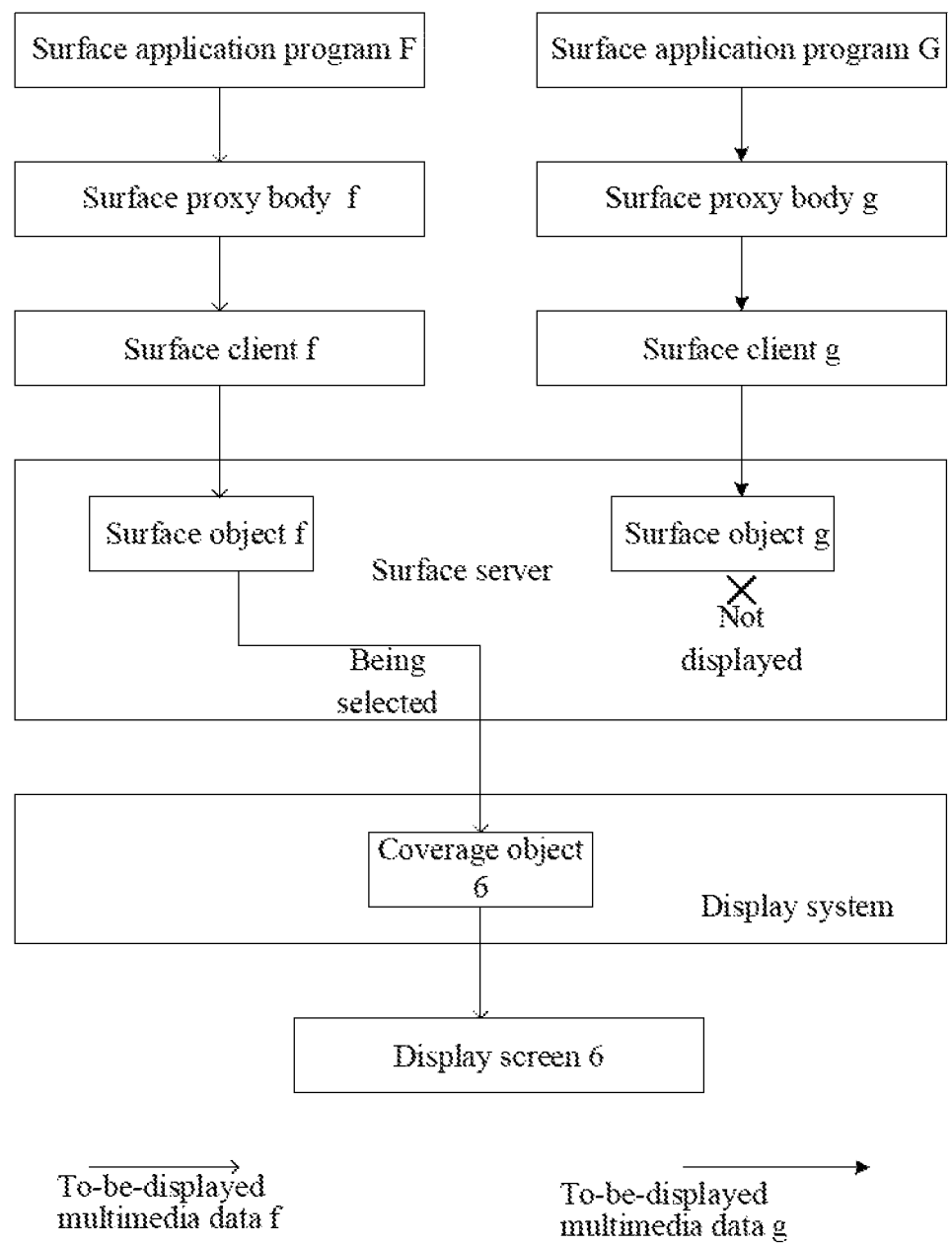
FIG. 11 is a schematic view of selecting to-be-displayed multimedia data that can be displayed according to priority in the case where the number of display screens cannot satisfy the displaying need of the surface application program in an embodiment of the proxy-pattern-based multimedia displaying method according to the present disclosure.

The number of the display screens needed by each surface application program is not necessarily one, so it may be first determined whether the number of the display screens satisfies the displaying need of the surface application programs when multiple surface application programs need to be displayed. If the number of the display screens cannot satisfy the displaying need of the surface application program, then the to-be-displayed multimedia data of a part of the surface application programs cannot be displayed. For example, referring to FIG. 11, a surface application program F sends to-be-displayed multimedia data f to a surface object f in the surface server through a surface proxy body f and a surface client f, a surface application program G sends to-be-displayed multimedia data g to a surface object g in the surface server through a surface proxy body g and a surface client g. Because there is only one display screen 6, and the surface application program F requires full screen display, the surface server cannot mix the to-be-displayed multimedia data f and g and can only select and send one of the to-be-displayed multimedia data f and g to a coverage object 6 (corresponding to the display screen 6) for display. In this example, the to-be-displayed multimedia data f from the surface application program F of a higher priority is selected, and the to-be-displayed multimedia data g is not displayed.

Although four cases are illustrated in the above descriptions, the four cases are not mutually exclusive but may co-occur in combination. In the above examples, except for the single surface application program/display screen particularly defined, the number of other surface application programs/display screens (e.g., two) is only for illustration and the actual number may vary as long as the limit condition (e.g., at least two) is satisfied; it is the display system that interfaces with the display screen in all of the above examples, but actually what interfaces with the display screen may be a display drive. Moreover, in all of the above examples, the surface entrusting body is based on the CS architecture, but actually the multiplex displaying may also be applied to the surface entrusting body based on the non-CS architecture.

The content being displayed may comprise at least one of a video, a picture, subtitle or the like, and the corresponding to-be-displayed multimedia data thereof is respectively decoded video data, decoded picture data, and subtitle. The video and the subtitle are all displayed dynamically, i.e., the content being displayed varies continuously in the case of normal play without any operation and interference, the video stream may be divided into multiple graphic frames, the subtitle stream may be divided into multiple sentences, and each of the graphic frames and each sentence of the subtitle have a specified displaying period of time. However, the picture is displayed statically.

Complete displaying processes for different contents to be displayed are illustrated with reference to attached drawings hereinafter.

Figure 12:
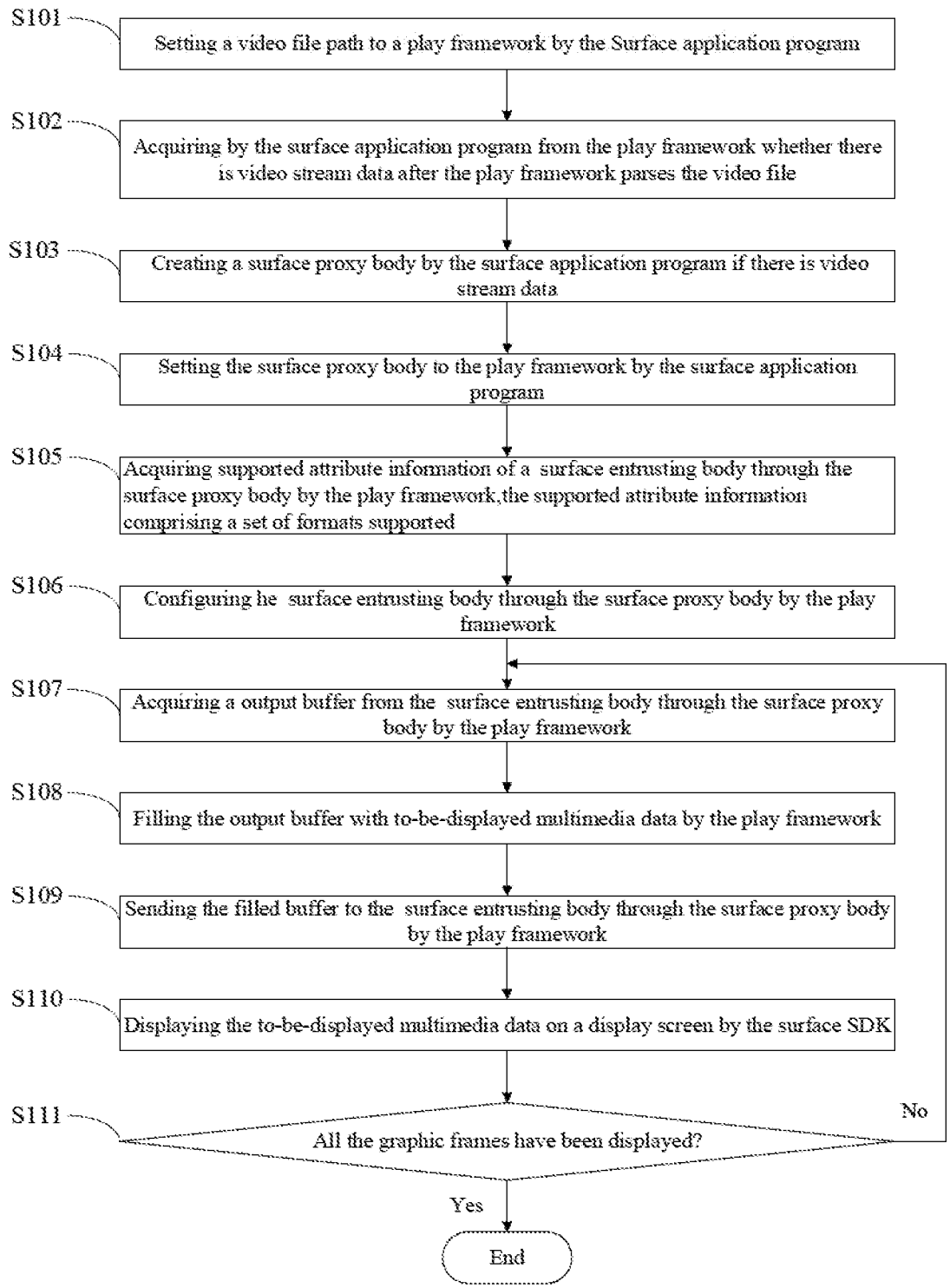
FIG. 12 is an overall schematic displaying flowchart diagram of a specific embodiment of the proxy-pattern-based multimedia displaying method according to the present disclosure.

In a specific embodiment of the present disclosure, the content to be displayed is a video, and this embodiment is a further extension of the aforesaid embodiments and thus the same contents will not be repeated herein. An overall displaying process of this embodiment is as shown in FIG. 12:

S101: setting a video file path to a play framework by the surface application program.

S102: acquiring by the surface application program from the play framework whether there is video stream data after the play framework parses the video file.

S103: creating a surface proxy body by the surface application program if there is video stream data.

S104: setting the surface proxy body to the play framework by the surface application program.

S105: acquiring supported attribute information of a surface entrusting body through the surface proxy body by the play framework, the supported attribute information comprising a set of formats supported.

S106: configuring the surface entrusting body through the surface proxy body by the play framework.

For example, a format as well as a total number, width and height of buffers required are selected.

S107: acquiring a output buffer from the surface entrusting body through the surface proxy body by the play framework.

S108: filling the output buffer with to-be-displayed multimedia data by the play framework.

The to-be-displayed multimedia data is decoded graphic frames to be displayed currently.

S109: sending the filled buffer to the surface entrusting body through the surface proxy body by the play framework.

S110: displaying the to-be-displayed multimedia data on a display screen by the surface entrusting body.

The buffer becomes free again after the displaying is finished.

S111: determining whether all the graphic frames have been displayed.

If the determination result is yes, then the process ends; and if the determination result is no, then the process skips to S107 and repeats S107 and the subsequent steps.

In the specific displaying process, in addition to specific data required by the displaying (e.g., a handle of the surface proxy body, configuration parameters, buffer identifier (ID) or the like), control commands required for transmitting the specific data (e.g., instructions of configuring the surface proxy body to the play framework, configuration instructions, instructions of acquiring the buffer or the like) are also transmitted between the surface application program/play framework and the surface proxy body as well as between the surface proxy body and the surface entrusting body. The transmission of the specific data and the control commands may be performed separately or performed simultaneously. For example, during the process of configuring the surface proxy body to the play framework by the surface application program, the surface application program sends the instruction of configuring the surface proxy body and the handle of the surface proxy body to the play framework at the same time. In the displaying process, all the control commands may be called a control flow and all the specific data may be called a data flow.

The following descriptions are based on whether the surface entrusting body is the CS architecture and whether the object to be processed is the control flow or data flow. In a specific process, if there is more than one piece of data to be displayed, then after the current data has been displayed, the part of calling the buffer, filling data and sending data to the surface realizing component at a bottom level for display is repeatedly performed to continue to display the subsequent portion.

Figure 13:
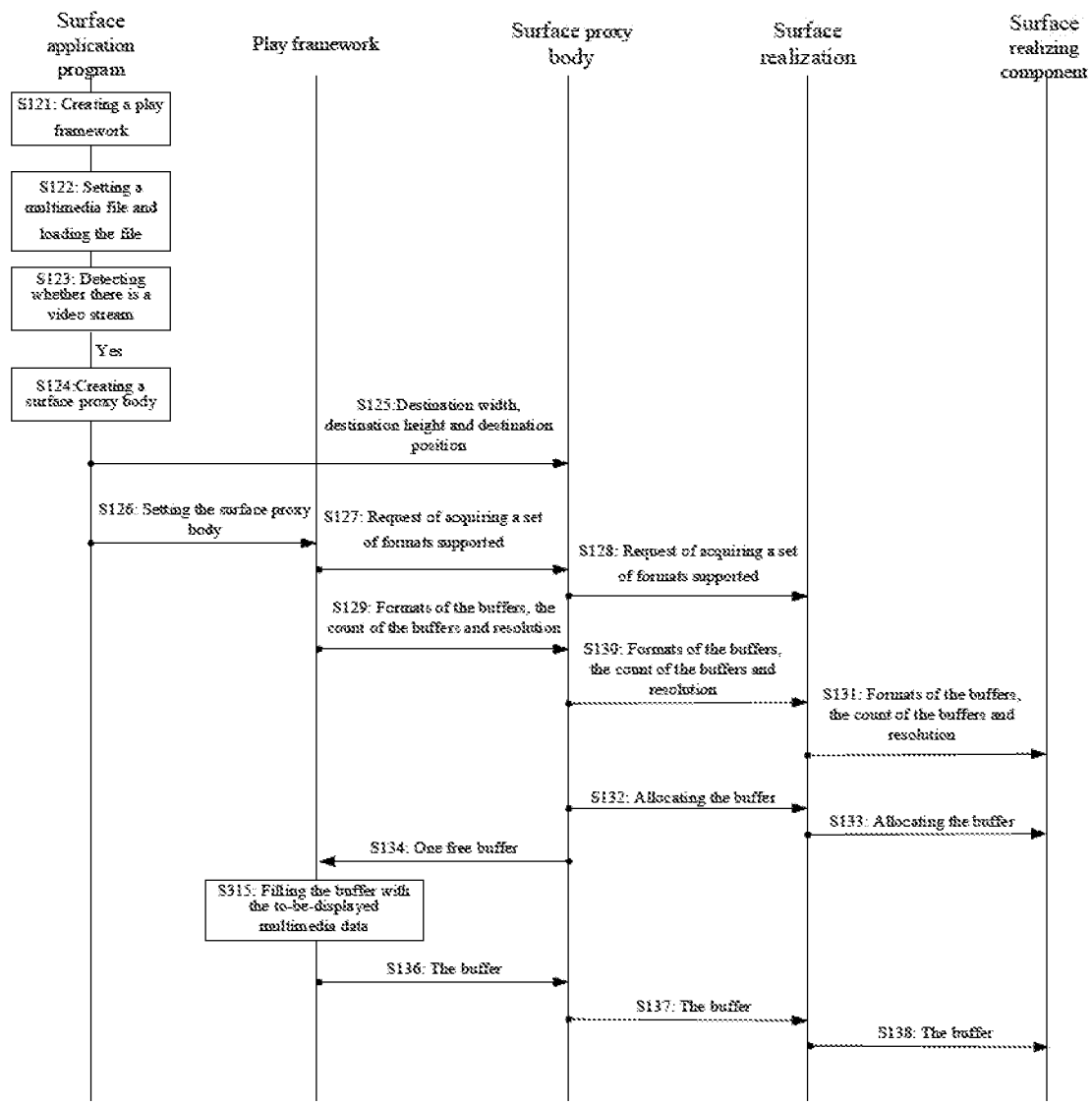
FIG. 13 is a schematic flowchart diagram in the case where the surface entrusting body is of a non-CS architecture and processes a control flow in a specific embodiment of the proxy-pattern-based multimedia displaying method according to the present disclosure.

In the case where the surface entrusting body is the non-CS architecture and the object to be processed is the control flow, the displaying process is as shown in FIG. 13:

S121: creating a play framework by the surface application program.

S122: setting a multimedia file and loading the file by the surface application program.

S123: detecting whether there is a video stream by the surface application program.

S124: creating a surface proxy body by the surface application program if there is a video stream.

S125: setting a destination width, a destination height and a destination position to the surface proxy body by the surface application program.

S126: setting the surface proxy body to the play framework by the surface application program.

S127: sending a request of acquiring a set of formats supported to the surface proxy body by the play framework.

S128: sending the request of acquiring a set of formats supported to the surface realization by the surface proxy body.

The play framework acquires a set of formats supported from the surface realization through the surface proxy body.

The play framework selects one of the set of formats supported as an output format.

S129: setting formats of the buffers, a the count of the buffers and the resolution to the surface proxy body by the play framework.

The format of the buffer matches with the output format.

S130: setting a surface realization according to the formats of the buffers, the count of the buffers and the resolution by the surface proxy body.

S131: configuring the surface realizing component according to the formats of the buffers, the count of the buffers and the resolution by the surface realization.

S132: notifying the surface realization to allocate the buffer by the surface proxy body.

S133: allocating the buffer from the surface realizing component by the surface realization.

S134: calling the surface proxy body to acquire one output buffer by the play framework.

S315: filling the buffer with the to-be-displayed multimedia data by the play framework.

S136: sending the buffer to the surface proxy body by the play framework.

S137: sending the buffer to the surface realization by the surface proxy body.

S138: sending the buffer to the surface realizing component by the surface realization.

The surface realizing component displays the content in the buffer, and the buffer become free again after the displaying is finished.

Figure 14:
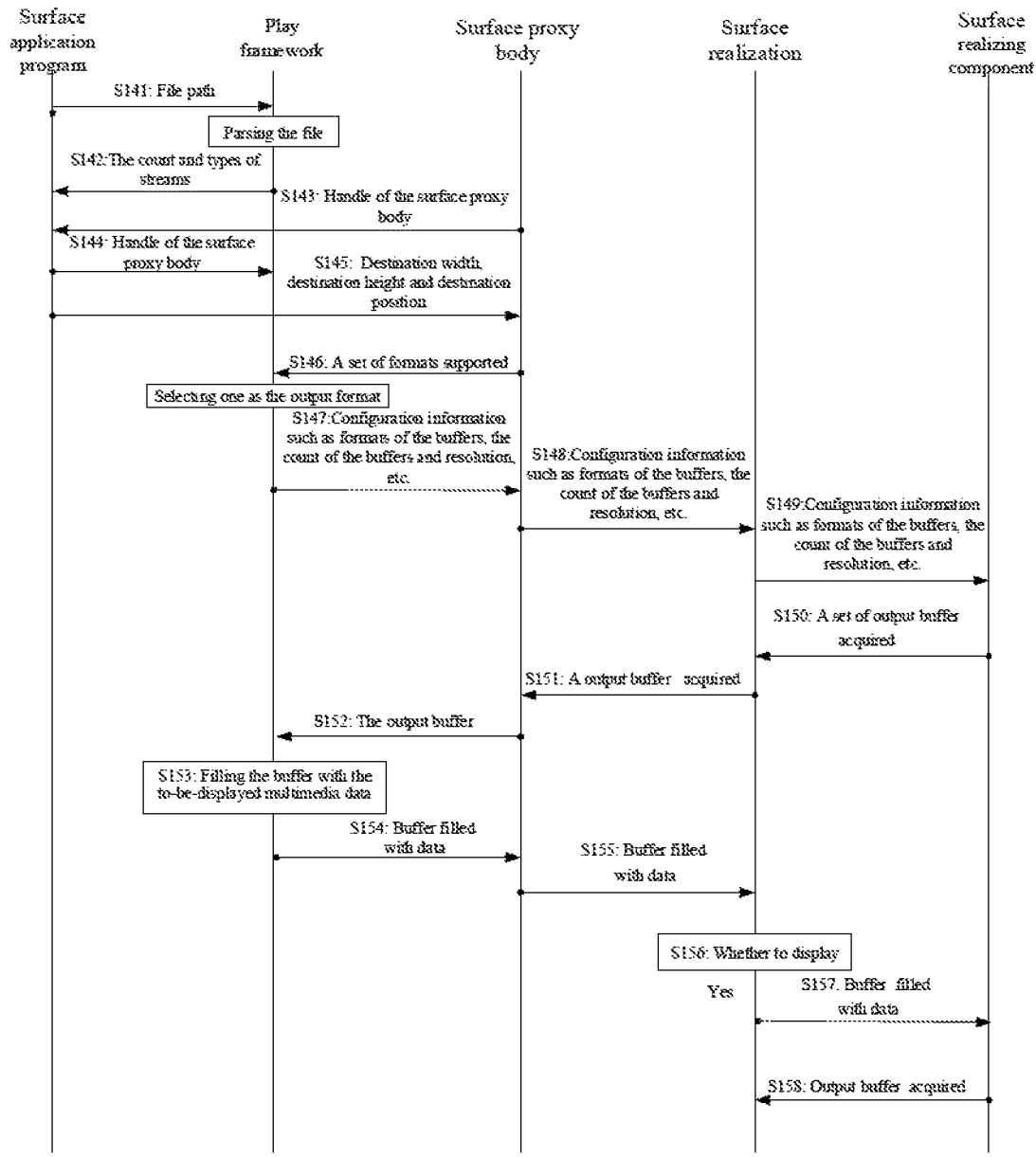
FIG. 14 is a schematic flowchart diagram in the case where the surface entrusting body is of a non-CS architecture and processes a data flow in a specific embodiment of the proxy-pattern-based multimedia displaying method according to the present disclosure.

In the case where the surface entrusting body is the non-CS architecture and the object to be processed is the data flow, the displaying process is as shown in FIG. 14:

S141: sending a file path to the play framework by the surface application program.

S142: sending a the count and types of streams to the surface application program by the play framework after parsing the file.

The streams refer to media streams included in the file, e.g., videos, audios, subtitle or the like, and for example, 1 path of video, 2 path of audio and 2 path of subtitle are obtained through the parsing.

S143: acquiring a handle of the surface proxy body by the surface application program.

S144: sending the handle of the surface proxy body to the play framework by the surface application program.

S145: sending the destination width, the destination height and the destination position to the surface proxy body by the surface application program.

S146: sending a set of formats supported to the play framework by the surface proxy body.

The play framework selects one from the set of formats supported as the output format.

S147: sending configuration information such as formats of the buffers, a the count of the buffers and the resolution or the like to the surface proxy body by the play framework.

S148: sending the configuration information such as the formats of the buffers, the count of the buffers and the resolution or the like to the surface realization by the surface proxy body.

S149: sending the configuration information such as the formats of the buffers, the count of the buffers and the resolution or the like to the surface realizing component by the surface realization.

S150: sending a set of free buffers acquired to the surface realization by the surface realizing component.

S151: sending a output buffer acquired to the surface proxy body by the surface realization.

The output buffer in this step belongs to the set of free buffers in the previous step.

S152: sending the output buffer to the play framework by the surface proxy body.

S153: filling the output buffer with the to-be-displayed multimedia data by the play framework.

S154: sending the buffer filled with data to the surface proxy body by the play framework.

S155: sending the buffer filled with data to the surface realization by the surface proxy body.

S156: determining whether to display by the surface realization.

S157: sending the buffer filled with data to the surface realizing component by the surface realization if it is determined to display.

The buffer returns back into the free status after the displaying is finished.

S158: returning the output buffer acquired to the surface realization by the surface realizing component after the displaying is finished.

Figure 15:
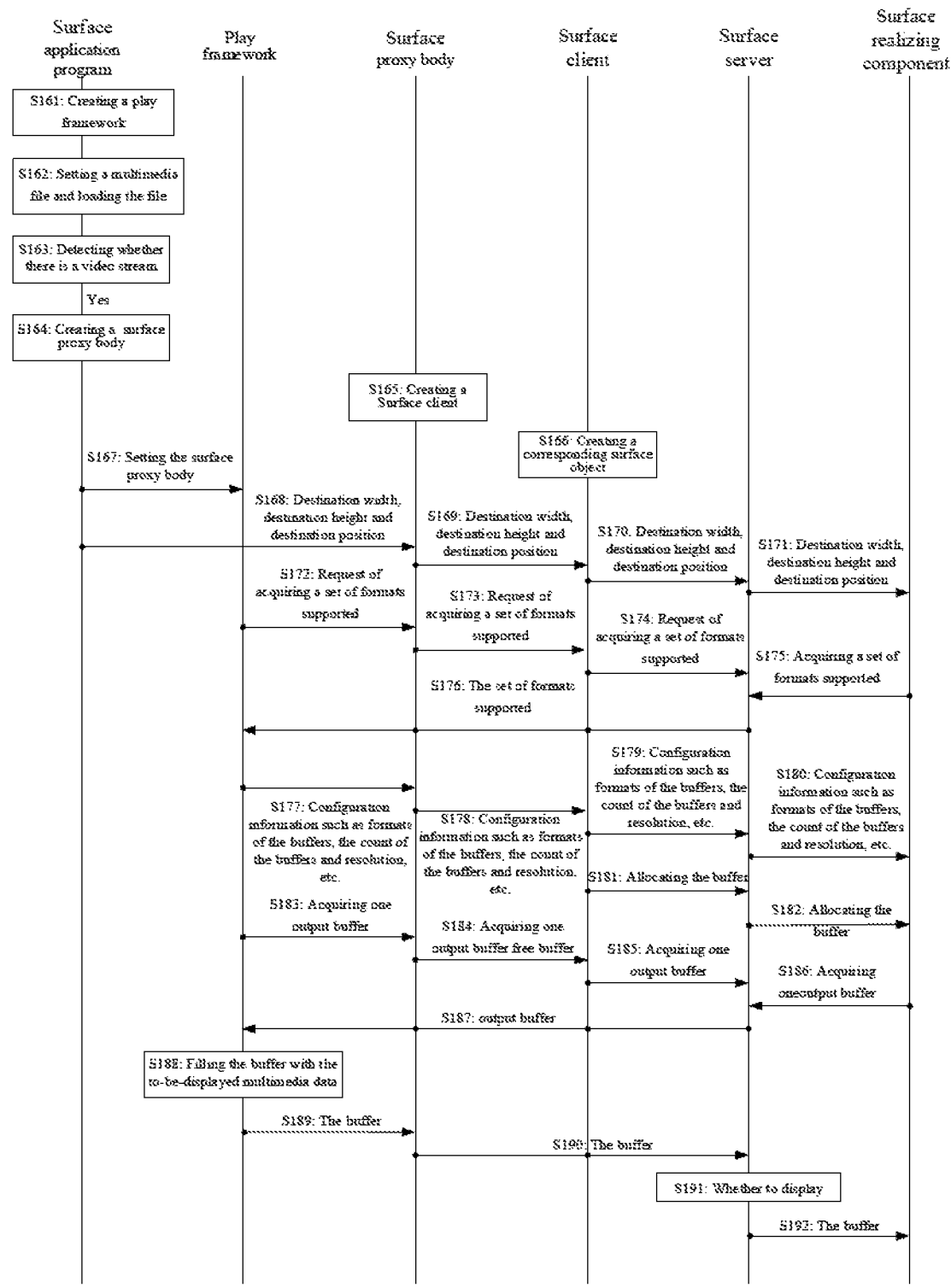
FIG. 15 is a schematic flowchart diagram in the case where the surface entrusting body is of a CS architecture and processes a control flow in a specific embodiment of the proxy-pattern-based multimedia displaying method according to the present disclosure.

In the case where the surface entrusting body is the CS architecture and the object to be processed is the control flow, the displaying process is as shown in FIG. 15:

S161: creating a play framework by the surface application program.

S162: setting a multimedia file and loading the file by the surface application program.

S163: detecting whether there is a video stream by the surface application program.

S164: creating a surface proxy body by the surface application program if there is a video stream.

S165: creating a surface client by the surface proxy body.

S166: creating a corresponding surface object in a surface server by the surface client.

S167: setting the surface proxy body to the play framework by the surface application program.

S168: setting a destination width, a destination height and a destination position to the surface proxy body by the surface application program.

S169: setting the destination width, the destination height and the destination position to the surface client by the surface proxy body.

S170: setting the destination width, the destination height and the destination position to the surface object by the surface client.

S171: setting the destination width, the destination height and the destination position to the surface realizing component by the surface server.

S172: sending a request of acquiring a set of formats supported to the surface proxy body by the play framework.

S173: sending the request of acquiring a set of formats supported to the surface client by the surface proxy body.

S174: sending the request of acquiring a set of formats supported to the surface server by the surface client.

S175: acquiring a set of formats supported from the surface realizing component by the surface server.

S176: returning the set of formats supported to the play framework through the surface client and the surface proxy body by the surface server.

The play framework selects one of the set of formats supported as an output format.

S177: setting configuration information such as formats of the buffers, a the count of the buffers and resolution or the like to the surface proxy body by the play framework.

S178: setting the configuration information such as the formats of the buffers, the count of the buffers and the resolution or the like to the surface client by the surface proxy body.

S179: setting the configuration information such as the formats of the buffers, the count of the buffers and the resolution or the like to the surface server by the surface client.

S180: setting the surface realizing component according to the configuration information such as the formats of the buffers, the count of the buffers and the resolution or the like by the surface server.

S181: notifying the surface server to allocate the buffer by the surface client.

S182: allocating the buffer from the surface realizing component by the surface server.

S183: calling the surface proxy body to send a request of acquiring one buffer by the play framework.

S184: sending a request of acquiring one output buffer to the surface client by the surface proxy body.

S185: sending the request of acquiring one output buffer to the surface server by the surface client.

S186: acquiring one output buffer from the surface realizing component by the surface server.

S187: returning the output buffer to the play framework through the surface client and the surface proxy body by the surface server.

S188: filling the buffer with the to-be-displayed multimedia data by the play framework.

S189: sending the buffer to the surface proxy body by the play framework.

S190: sending the buffer to the surface server by the surface proxy body.

S191: determining whether to display by the surface server.

S192: sending the buffer to the surface realizing component by the surface server if it is determined to display.

Figure 16:
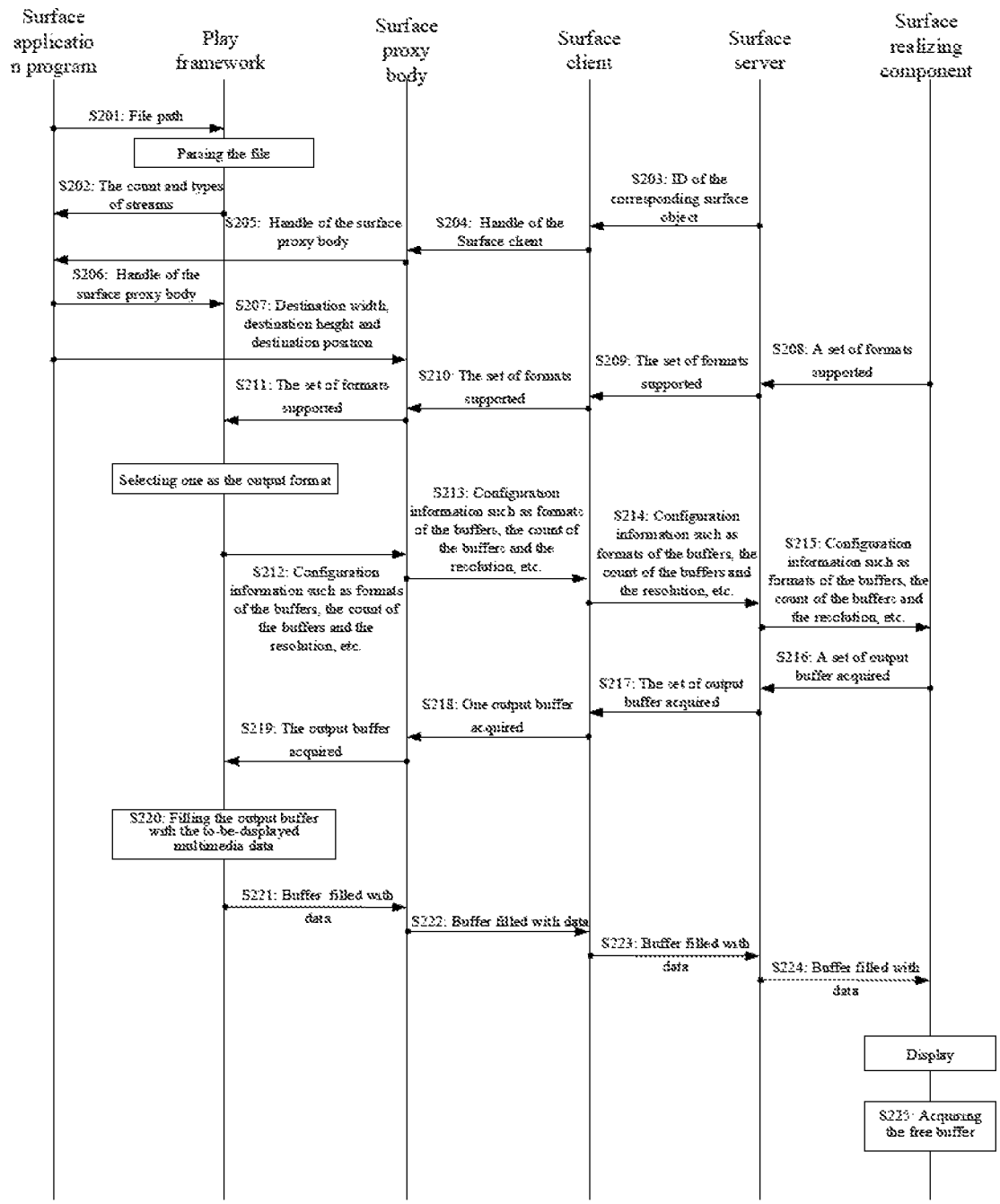
FIG. 16 is a schematic flowchart diagram in the case where the surface entrusting body is of a CS architecture and processes a data flow in a specific embodiment of the proxy-pattern-based multimedia displaying method according to the present disclosure.

In the case where the surface entrusting body is the CS architecture and the object to be processed is the data flow, the displaying process is as shown in FIG. 16:

S201: sending a file path to the play framework by the surface application program.

S202: sending a the count and types of streams to the surface application program by the play framework after parsing the file.

S203: acquiring an ID of the surface object corresponding to the surface client from the surface server by the surface client.

S204: acquiring a handle of the surface client by the surface proxy body.

S205: acquiring a handle of the surface proxy body by the surface application program.

S206: sending the handle of the surface proxy body to the play framework by the surface application program.

S207: sending the destination width, the destination height and the destination position to the surface proxy body by the surface application program.

S208: acquiring a set of formats supported from the surface realizing component by the surface server.

S209: acquiring the set of formats supported from the surface server by the surface client.

S210: acquiring the set of formats supported from the surface client by the surface proxy body.

S211: acquiring the set of formats supported from the surface proxy body by the play framework.

The play framework selects one of the set of formats supported as the output format.

S212: sending configuration information such as formats of the buffers, a the count of the buffers and resolution or the like to the surface proxy body by the play framework.

S213: sending the configuration information such as the formats of the buffers, the count of the buffers and the resolution or the like to the surface client by the surface proxy body.

S214: sending the configuration information such as the formats of the buffers, the count of the buffers and the resolution or the like to the surface server by the surface client.

S215: sending the configuration information such as the formats of the buffers, the count of the buffers and the resolution or the like to the surface realizing component by the surface server.

S216: sending a set of free buffers acquired to the surface server by the surface realizing component.

S217: sending the set of free buffers acquired to the surface client by the surface server.

S218: sending one output buffer acquired to the surface proxy body by the surface client.

The output buffer belongs to the set of free buffers in the previous step.

S219: sending the output buffer to the play framework by the surface proxy body.

S220: filling the output buffer with the to-be-displayed multimedia data by the play framework.

S221: sending the buffer filled with data to the surface proxy body by the play framework.

S222: sending the buffer filled with data to the surface client by the surface proxy body.

S223: sending the buffer filled with data to the surface server by the surface client.

S224: sending the buffer filled with data to the surface realizing component by the surface server.

The buffer returns back into the free status after the displaying is finished.

S225: acquiring the output buffer by the surface realizing component.

Figure 17:
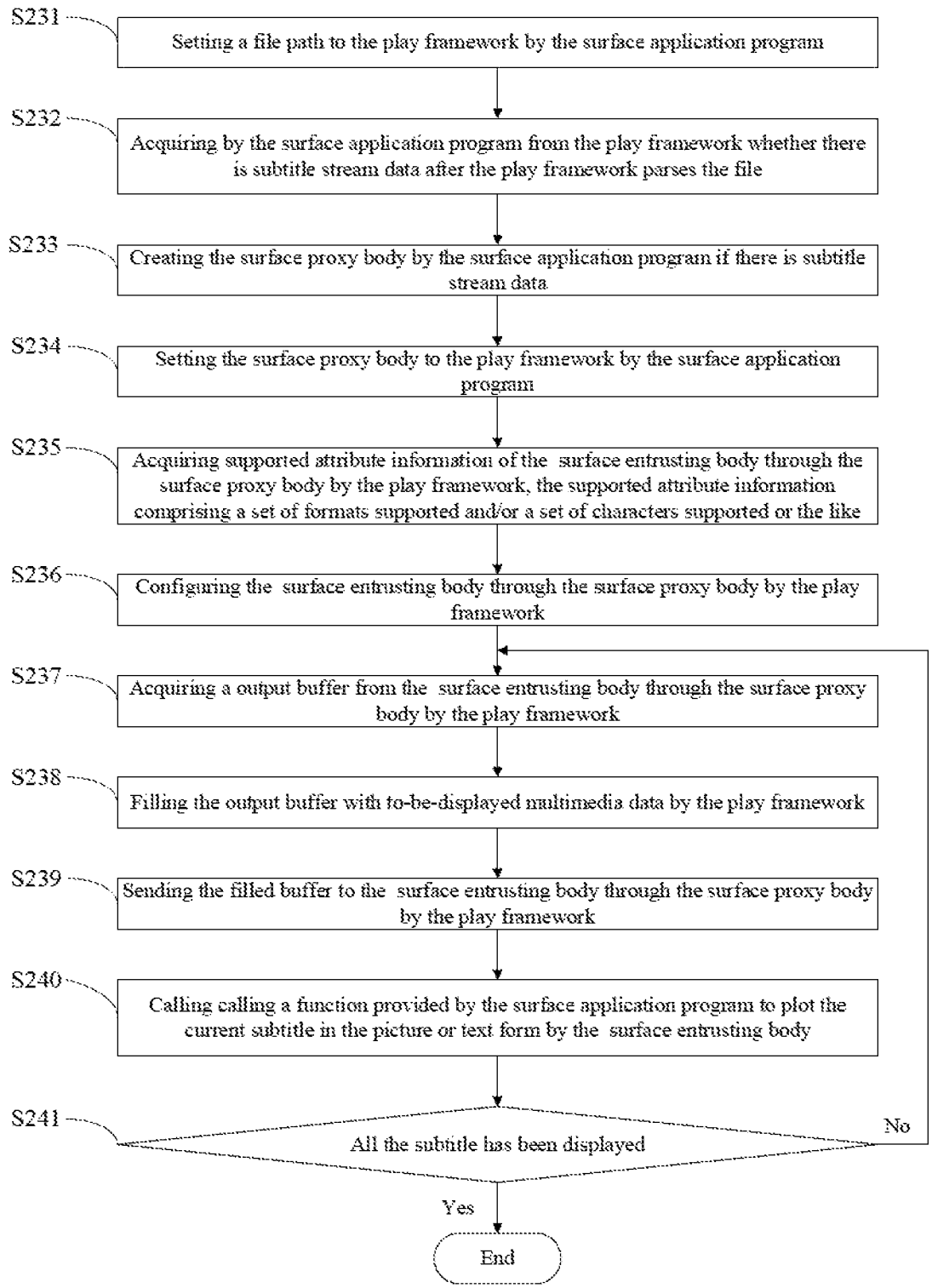
FIG. 17 is an overall schematic displaying flowchart diagram of another specific embodiment of the proxy-pattern-based multimedia displaying method according to the present disclosure.

In another specific embodiment of the present disclosure, the content to be displayed is subtitle and the display entrusting side calls a function provided by the surface application program to display the subtitle, and this embodiment is a further extension of the aforesaid embodiments and thus the same contents will not be repeated herein. An overall displaying process of this embodiment is as shown in FIG. 17:

S231: setting a file path to the play framework by the surface application program.

S232: acquiring by the surface application program from the play framework whether there is subtitle stream data after the play framework parses the file.

S233: creating the surface proxy body by the surface application program if there is subtitle stream data.

S234: setting the surface proxy body to the play framework by the surface application program.

S235: acquiring supported attribute information of the surface entrusting body through the surface proxy body by the play framework, the supported attribute information comprising a set of formats supported and/or a set of characters supported or the like.

S236: configuring the surface entrusting body through the surface proxy body by the play framework.

For example, a format as well as a total number, width and height of buffers required or the like are selected.

S237: acquiring a output buffer from the surface entrusting body through the surface proxy body by the play framework.

S238: filling the output buffer with to-be-displayed multimedia data by the play framework.

The to-be-displayed multimedia data is the current subtitle, and it may be in the picture form or in the text form after character set conversion.

S239: sending the filled buffer to the surface entrusting body through the surface proxy body by the play framework.

S240: calling a function provided by the surface application program to plot the current subtitle in the picture or text form by the surface entrusting body.

If the surface entrusting body is the non-CS architecture, then the surface realization receives the filled buffer from the surface proxy body and then calls the function to plot the current subtitle. If the surface entrusting body is the CS architecture, then the surface client receives the filled buffer from the surface proxy body and then sends the filled buffer to the surface server, and the surface server calls the function to plot the current subtitle.

The buffer becomes free again after the displaying is finished.

S241: determining whether all the subtitle has been displayed.

If the determination result is yes, then the process ends; and if the determination result is no, then the process skips to S237 and repeats S237 and the subsequent steps.

The following descriptions take the surface entrusting body of a non-CS architecture as an example and are based on whether the object to be processed is the control flow or data flow. In a specific process, if there is more than one piece of data to be displayed, then after the current data has been displayed, the part of calling the buffer, filling data and sending data to the surface realizing component at a bottom level for display may be repeatedly performed to continue to display the subsequent portion.

Figure 18:
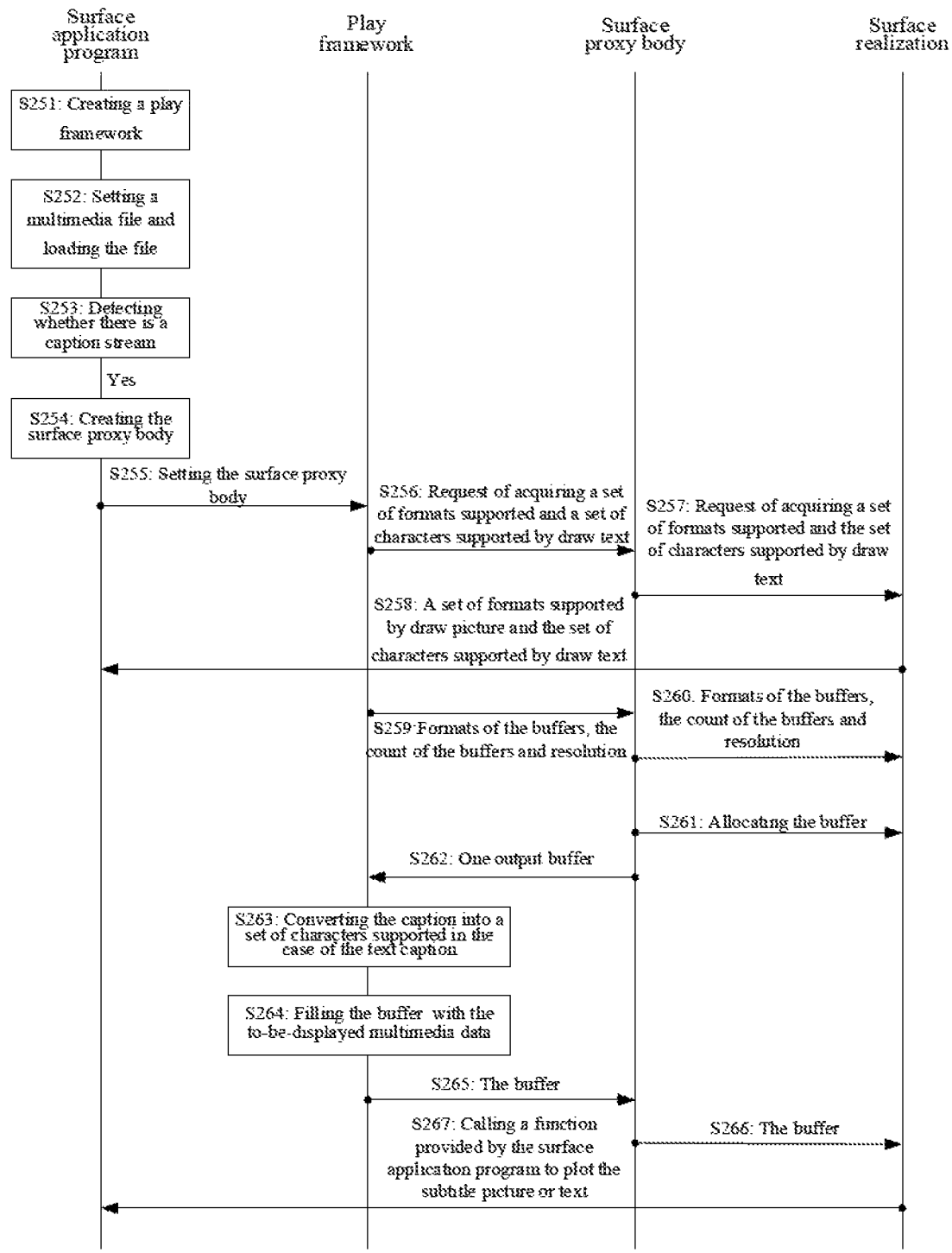
FIG. 18 is a schematic flowchart diagram in the case where the surface entrusting body is of a non-CS architecture and processes a control flow in another specific embodiment of the proxy-pattern-based multimedia displaying method according to the present disclosure.

In the case where the object to be processed is the control flow, the displaying process is as shown in FIG. 18:

S251: creating a play framework by the surface application program.

S252: setting a multimedia file and loading the file by the surface application program.

S253: detecting whether there is a subtitle stream by the surface application program.

S254: creating the surface proxy body by the surface application program if there is a subtitle stream.

S255: setting the surface proxy body to the play framework by the surface application program.

S256: sending a request of acquiring a set of formats supported and a set of characters supported by draw text to the surface proxy body by the play framework.

draw text is a plotting function provided by the surface application program that is capable of processing subtitle in the text form.

S257: sending a request of acquiring a set of formats supported by the surface realization and the set of characters supported by draw text to the surface realization by the surface proxy body.

S258: acquiring a set of formats supported by draw picture of the surface application program and the set of characters supported by draw text by the surface realization.

draw picture is a plotting function provided by the surface application program that is capable of processing subtitle in the picture form.

The play framework acquires the set of formats supported and the set of characters supported from the surface realization through the surface proxy body.

The play framework selects one of the set of formats supported/the set of characters supported as an output format.

S259: setting formats of the buffers (in the case of picture subtitle), a count of the buffers and resolution to the surface proxy body by the play framework.

The format of the buffer matches with the output format.

S260: setting the surface realization according to the formats of the buffers, the count of the buffers and the resolution by the surface proxy body.

S261: allocating the buffer by the surface proxy body.

S262: calling the surface proxy body to acquire one buffer by the play framework.

S263: converting the subtitle into a set of characters supported by the play framework in the case of the text subtitle.

S264: filling the buffer with the to-be-displayed multimedia data by the play framework.

S265: sending the buffer to the surface proxy body by the play framework.

S266: sending the buffer to the surface realization by the surface proxy body.

S267: calling a function provided by the surface application program to plot the subtitle picture or text by the surface realization.

Figure 19:
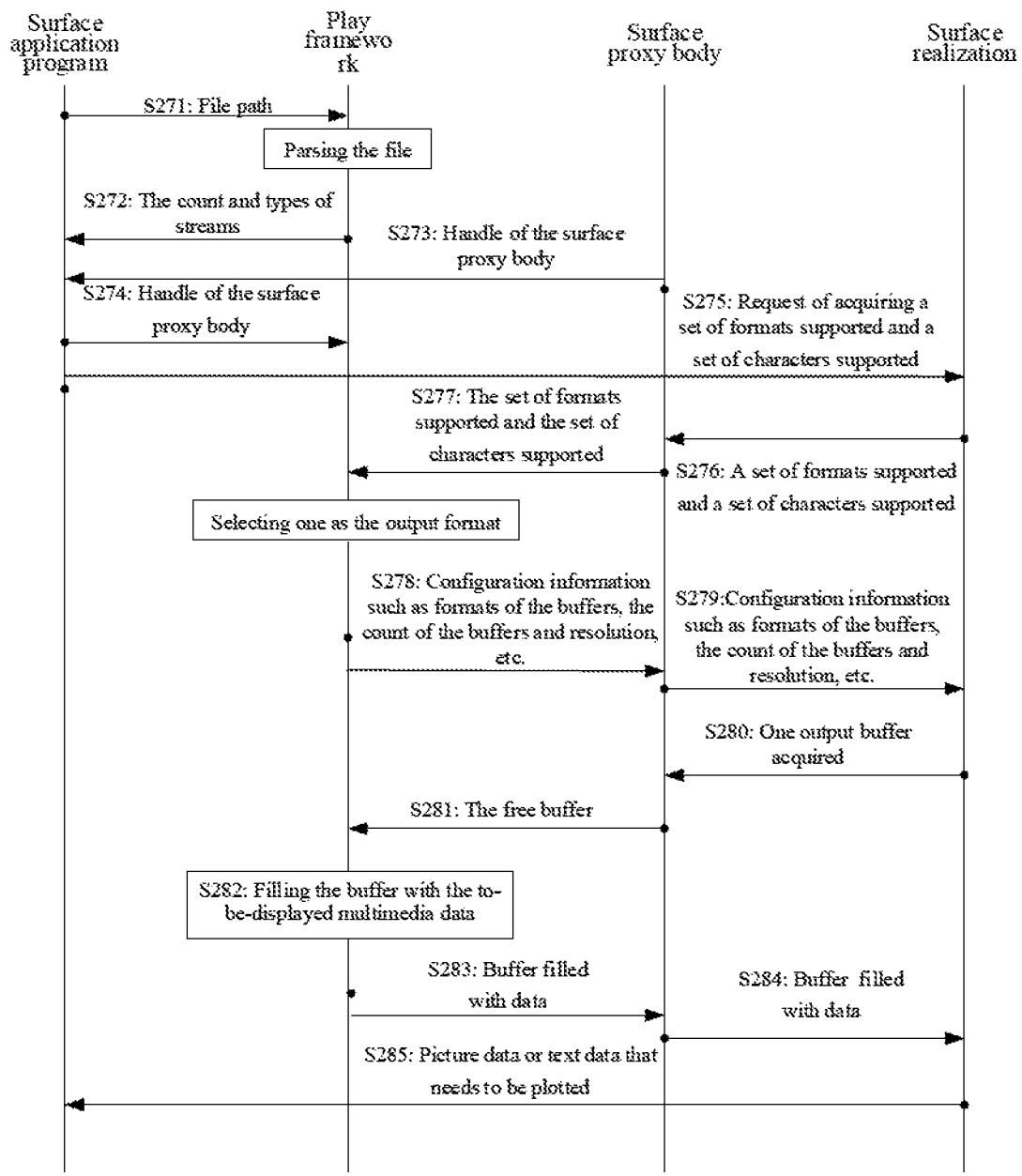
FIG. 19 is a schematic flowchart diagram in the case where the surface entrusting body is of a non-CS architecture and processes a data flow in another specific embodiment of the proxy-pattern-based multimedia displaying method according to the present disclosure.

In the case where the object to be processed is the data flow, the displaying process is as shown in FIG. 19:

S271: sending a file path to the play framework by the surface application program.

S272: sending a the count and types of streams to the surface application program by the play framework after parsing the file.

The streams refer to media streams included in the file, e.g., videos, audios, subtitle or the like, and for example, 1 path of video, 2 path of audio and 2 path of subtitle are obtained through the parsing.

S273: acquiring a handle of the surface proxy body by the surface application program.

S274: sending the handle of the surface proxy body to the play framework by the surface application program.

S275: sending a request of acquiring a set of formats supported and a set of characters supported to the surface realization through the surface proxy body by the surface application program.

S276: sending a set of formats supported and a set of characters supported to the surface proxy body by the surface realization.

S277: sending the set of formats supported and the set of characters supported to the play frame by the surface proxy body.

The play framework selects one from the set of formats supported and the set of characters supported as the output format.

S278: sending configuration information such as formats of the buffers, a the count of the buffers and resolution or the like to the surface proxy body by the play framework.

S279: sending the configuration information such as the formats of the buffers, the count of the buffers and the resolution or the like to the surface realization by the surface proxy body.

S280: sending one output buffer acquired to the surface proxy body by the surface realization.

S281: sending the output buffer to the play framework by the surface proxy body.

S282: filling the output buffer with the to-be-displayed multimedia data by the play framework.

S283: sending the buffer filled with data to the surface proxy body by the play framework.

S284: sending the buffer filled with data to the surface realization by the surface proxy body.

S285: sending picture data or text data that needs to be plotted to the surface application program for plotting by the surface realization.

The surface entrusting body is the non-CS architecture in all of the specific processes shown in this embodiment, and if the surface entrusting body is the CS architecture, then the surface server therein calls the function provided by the surface application program to plot the subtitle.

Figure 20:
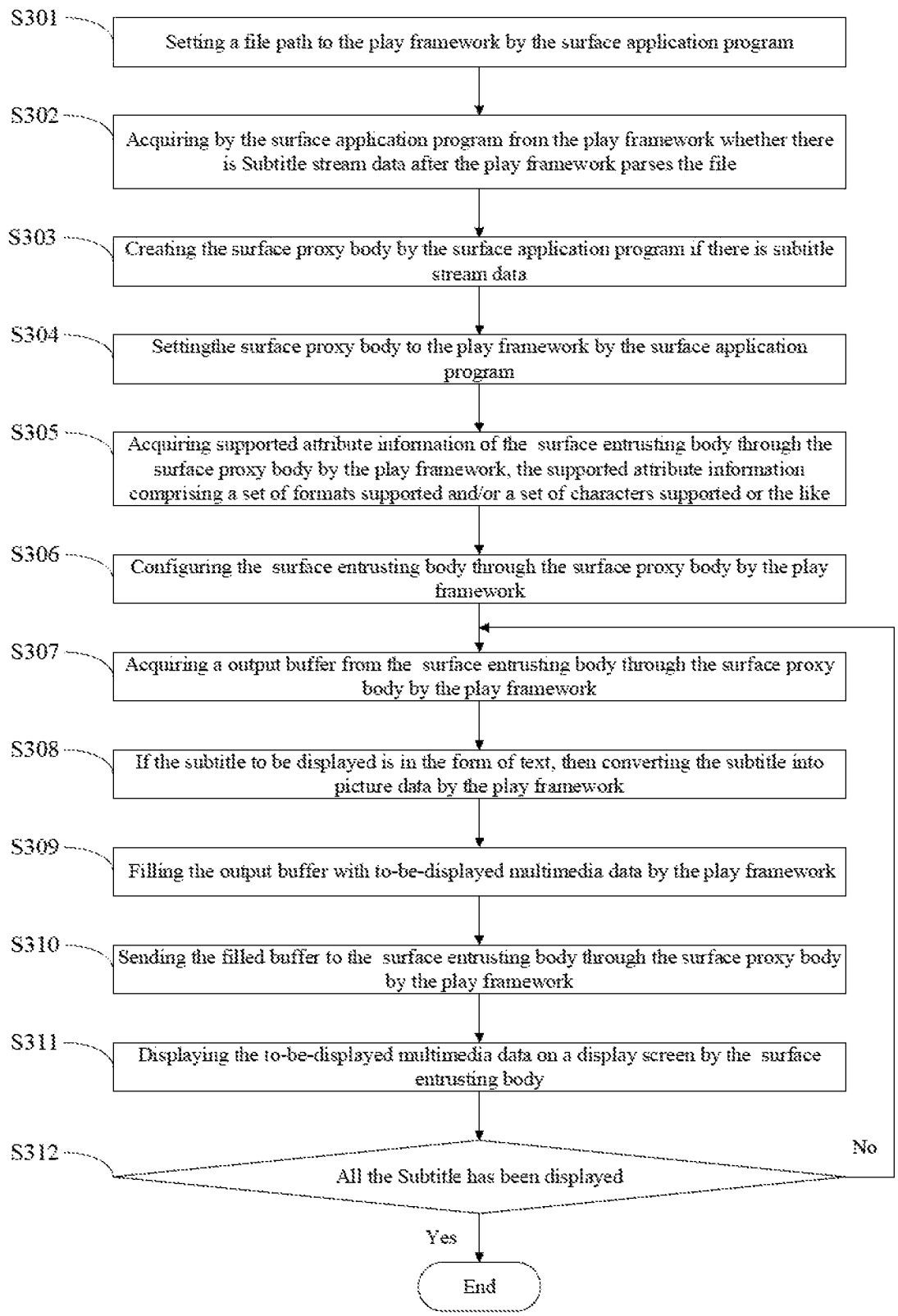
FIG. 20 is an overall schematic displaying flowchart diagram of yet another specific embodiment of the proxy-pattern-based multimedia displaying method according to the present disclosure.

In another specific embodiment of the present disclosure, the content to be displayed is subtitle and the display entrusting side calls the surface realizing component to display the subtitle, and this embodiment is a further extension of the aforesaid embodiments and thus the same contents will not be repeated herein. An overall displaying process of this embodiment is as shown in FIG. 20:

S301: setting a file path to the play framework by the surface application program.

S302: acquiring by the surface application program from the play framework whether there is subtitle stream data after the play framework parses the file.

S303: creating the surface proxy body by the surface application program if there is subtitle stream data.

S304: setting the surface proxy body to the play framework by the surface application program.

S305: acquiring supported attribute information of the surface entrusting body through the surface proxy body by the play framework, the supported attribute information comprising a set of formats supported and/or a set of characters supported or the like.

S306: configuring the surface entrusting body through the surface proxy body by the play framework.

For example, a format as well as a total number, width and height of buffers required or the like are selected.

S307: acquiring a output buffer from the surface entrusting body through the surface proxy body by the play framework.

S308: if the subtitle to be displayed is in the text form, then converting the subtitle into picture data by the play framework.

If the subtitle to be displayed is in the picture form, then this step may be omitted.

S309: filling the output buffer with to-be-displayed multimedia data by the play framework.

The to-be-displayed multimedia data is the subtitle data in the picture form.

S310: sending the filled buffer to the surface entrusting body through the surface proxy body by the play framework.

S311: displaying the to-be-displayed multimedia data on a display screen by the surface entrusting body.

The buffer becomes free again after the displaying is finished.

S312: determining whether all the subtitle has been displayed.

If the determination result is yes, then the process ends; and if the determination result is no, then the process skips to S307 and repeats S307 and the subsequent steps.

For the specific process in the cases whether the surface entrusting body is the CS architecture and the object to be processed is the control flow or data flow, except for that the play framework needs to determine whether the subtitle to be displayed is in the text form before filling the buffer with the to-be-displayed multimedia data and converts the subtitle into picture form if the subtitle is in the text form, reference may be made to the specific processing flows of videos described above for the remaining part, and thus the remaining part will not be repeated herein.

Figure 21:
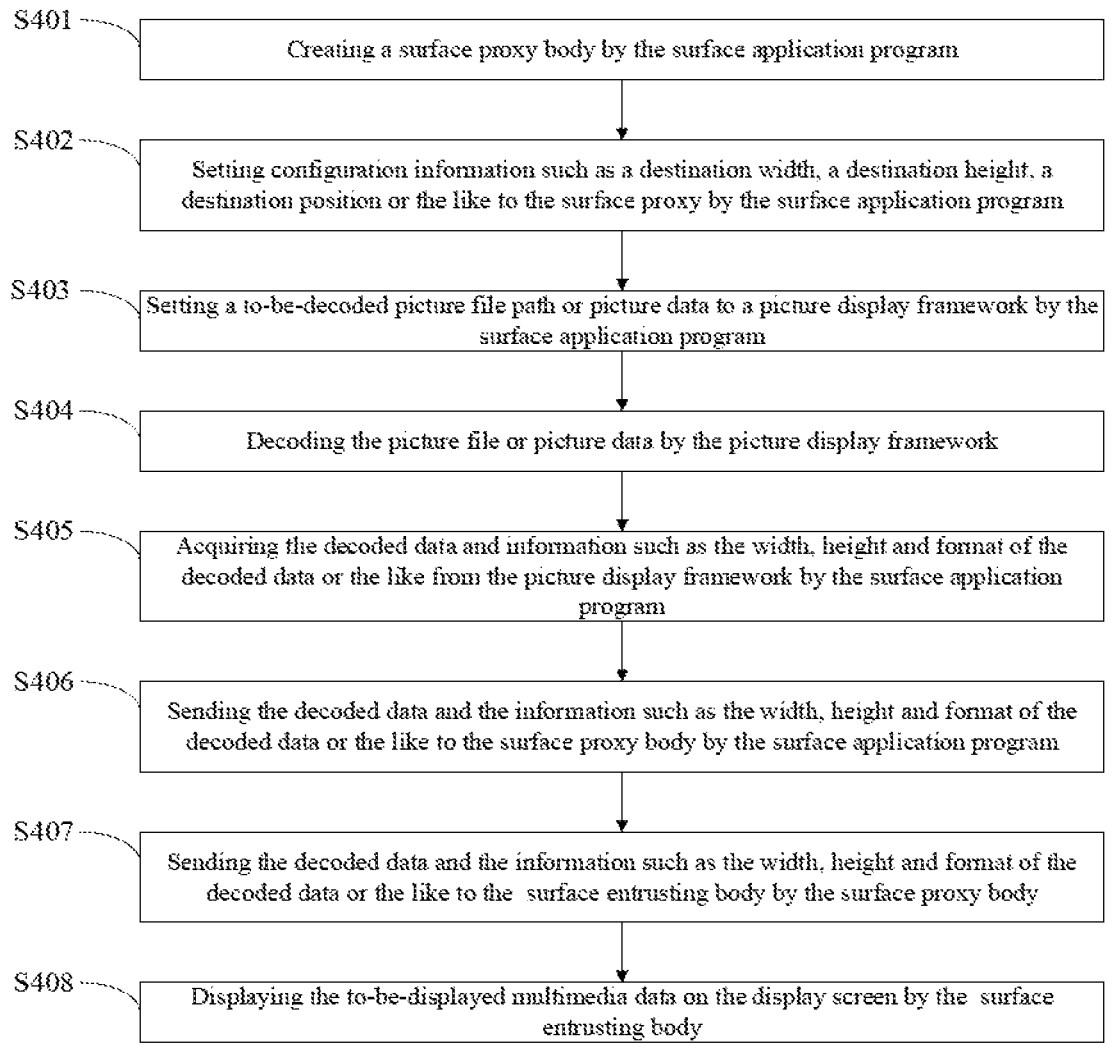
FIG. 21 is an overall schematic displaying flowchart diagram of a further specific embodiment of the proxy-pattern-based multimedia displaying method according to the present disclosure.

In yet another specific embodiment of the present disclosure, the content to be displayed is a picture, and this embodiment is a further extension of the aforesaid embodiments and thus the same contents will not be repeated herein. An overall displaying process of this embodiment is as shown in FIG. 21:

S401: creating a surface proxy body by the surface application program.

S402: setting configuration information such as a destination width, a destination height, a destination position or the like to the surface proxy body by the surface application program.

S403: setting a to-be-decoded picture file path or picture data to a picture display framework by the surface application program.

S404: decoding the picture file or picture data by the picture display framework.

S405: acquiring the decoded data and information such as the width, height and format of the decoded data or the like from the picture display framework by the surface application program.

S406: sending the decoded data and the information such as the width, height and format of the decoded data or the like to the surface proxy body by the surface application program.

S407: sending the decoded data and the information such as the width, height and format of the decoded data or the like to the surface entrusting body by the surface proxy body.

S408: displaying the to-be-displayed multimedia data on the display screen by the surface entrusting body.

The following descriptions are based on whether the surface entrusting body is the CS architecture and whether the object to be processed is the control flow or data flow.

Figure 22:
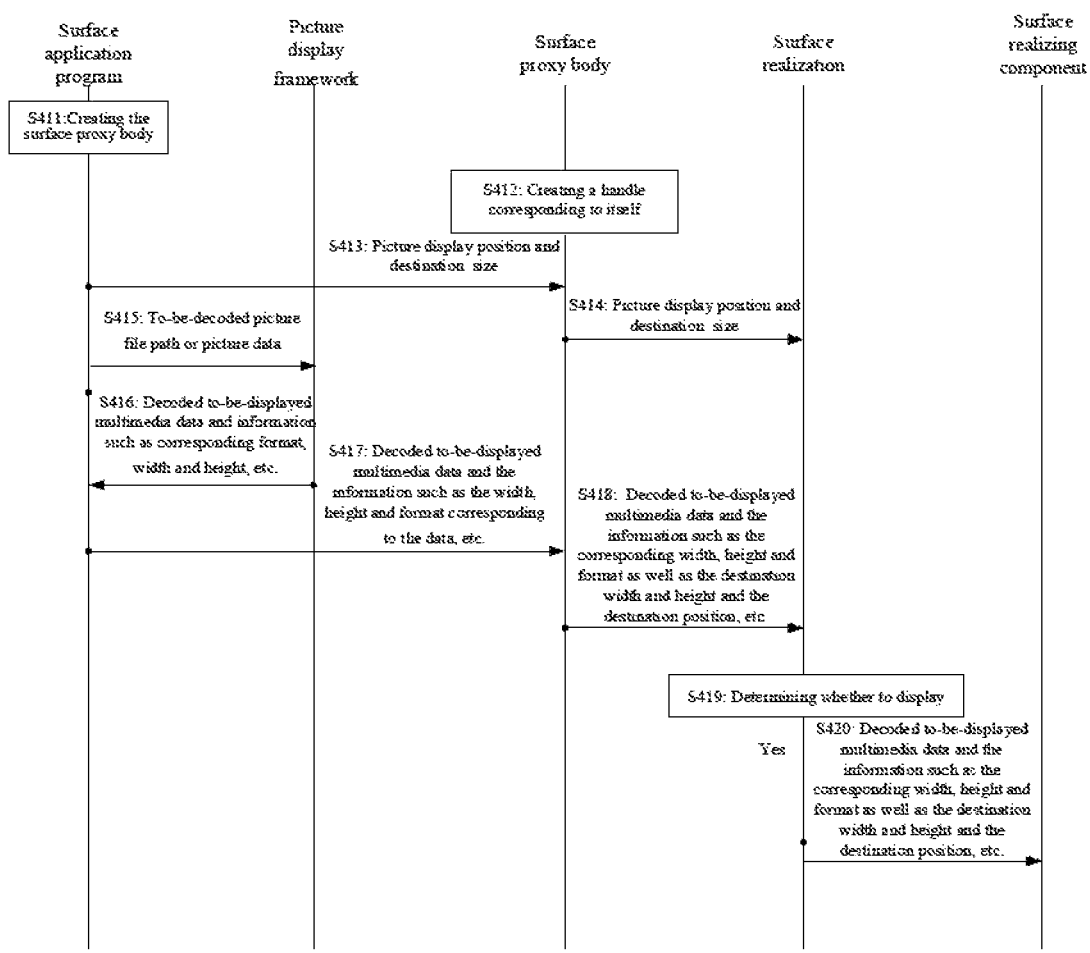
FIG. 22 is a schematic flowchart diagram in the case where the surface entrusting body is of a non-CS architecture and processes a control flow in a further specific embodiment of the proxy-pattern-based multimedia displaying method according to the present disclosure.

In the case where the surface entrusting body is the non-CS architecture and the object to be processed is the control flow, the displaying process is as shown in FIG. 22:

S411: creating the surface proxy body by the surface application program.

S412: creating, by the surface proxy body, a handle corresponding to the surface proxy body itself.

S413: setting a picture display position and a destination size to the surface proxy body by the surface application program.

S414: setting the picture display position and the destination size to the surface realization by the surface proxy body.

S415: setting a to-be-decoded picture file path or picture data to the picture display framework by the surface application program.

S416: acquiring the decoded to-be-displayed multimedia data and information such as the format, width and height corresponding to the to-be-displayed multimedia data or the like from the picture display framework by the surface application program.

S417: sending the decoded to-be-displayed multimedia data and the information such as the width, height and format corresponding to the to-be-displayed multimedia data or the like to the surface proxy body by the surface application program.

S418: sending the decoded to-be-displayed multimedia data and the information such as the corresponding width, height and format as well as the destination width and height and the destination position or the like to the surface realization by the surface proxy body.

S419: determining whether to display by the surface realization.

S420: if it is determined to display, then sending the decoded to-be-displayed multimedia data and the information such as the corresponding width, height and format as well as the destination width and height and the destination position or the like to the surface realizing component for display by the surface realization.

Figure 23:
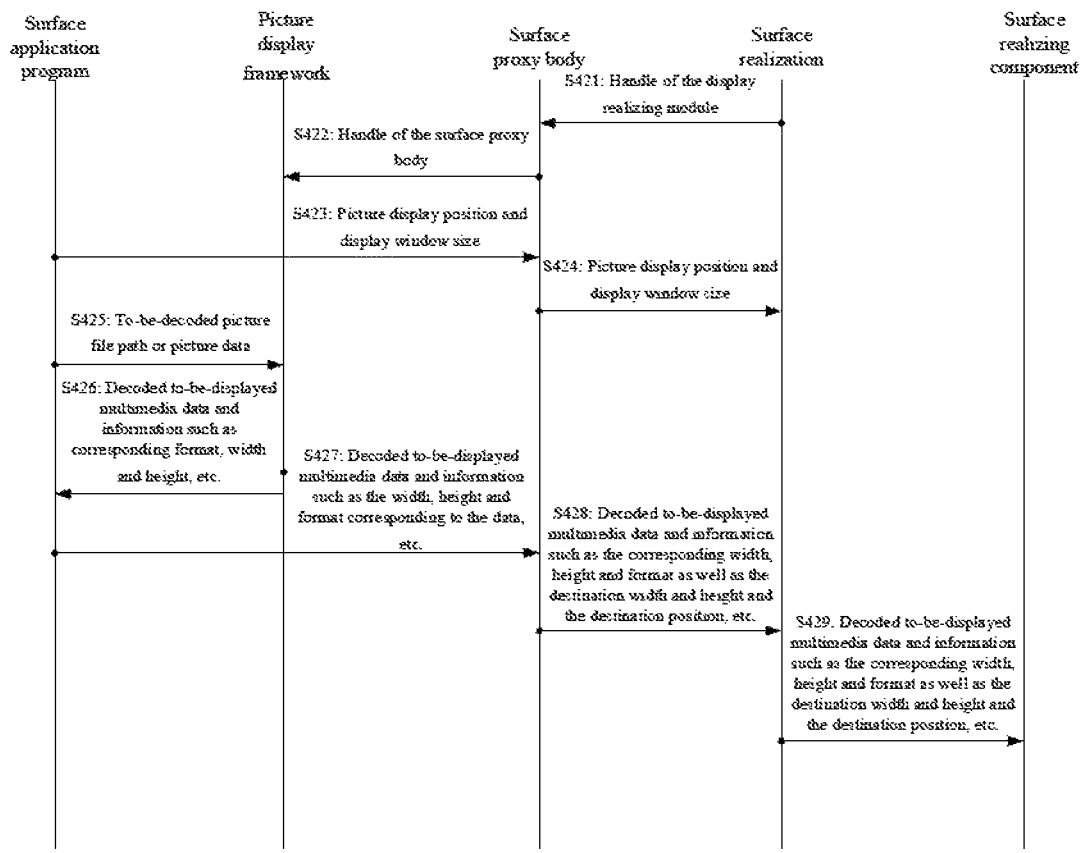
FIG. 23 is a schematic flowchart diagram in the case where the surface entrusting body is of a non-CS architecture and processes a data flow in a further specific embodiment of the proxy-pattern-based multimedia displaying method according to the present disclosure.

In the case where the surface entrusting body is the non-CS architecture and the object to be processed is the data flow, the displaying process is as shown in FIG. 23:

S421: sending a handle of the surface realization to the surface proxy body by the surface realization.

S422: sending the handle of the surface proxy body to the surface application program by the surface proxy body.

S423: setting the picture display position and the destination size to the surface proxy body by the surface application program.

S424: setting the picture display position and the destination size to the surface realization by the surface proxy body.

S425: setting the to-be-decoded picture file path or picture data to the picture display framework by the surface application program.

S426: acquiring the decoded to-be-displayed multimedia data and information such as the format, width and height corresponding to the to-be-displayed multimedia data or the like from the picture display framework by the surface application program.

S427: sending the decoded to-be-displayed multimedia data and the information such as the width, height and format corresponding to the to-be-displayed multimedia data or the like to the surface proxy body by the surface application program.

S428: sending the decoded to-be-displayed multimedia data and the information such as the corresponding width, height and format as well as the destination width and height and the destination position or the like to the surface realization by the surface proxy body.

S429: sending the decoded to-be-displayed multimedia data and the information such as the corresponding width, height and format as well as the destination width and height and the destination position or the like to the surface realizing component for display by the surface realization.

Figure 24:
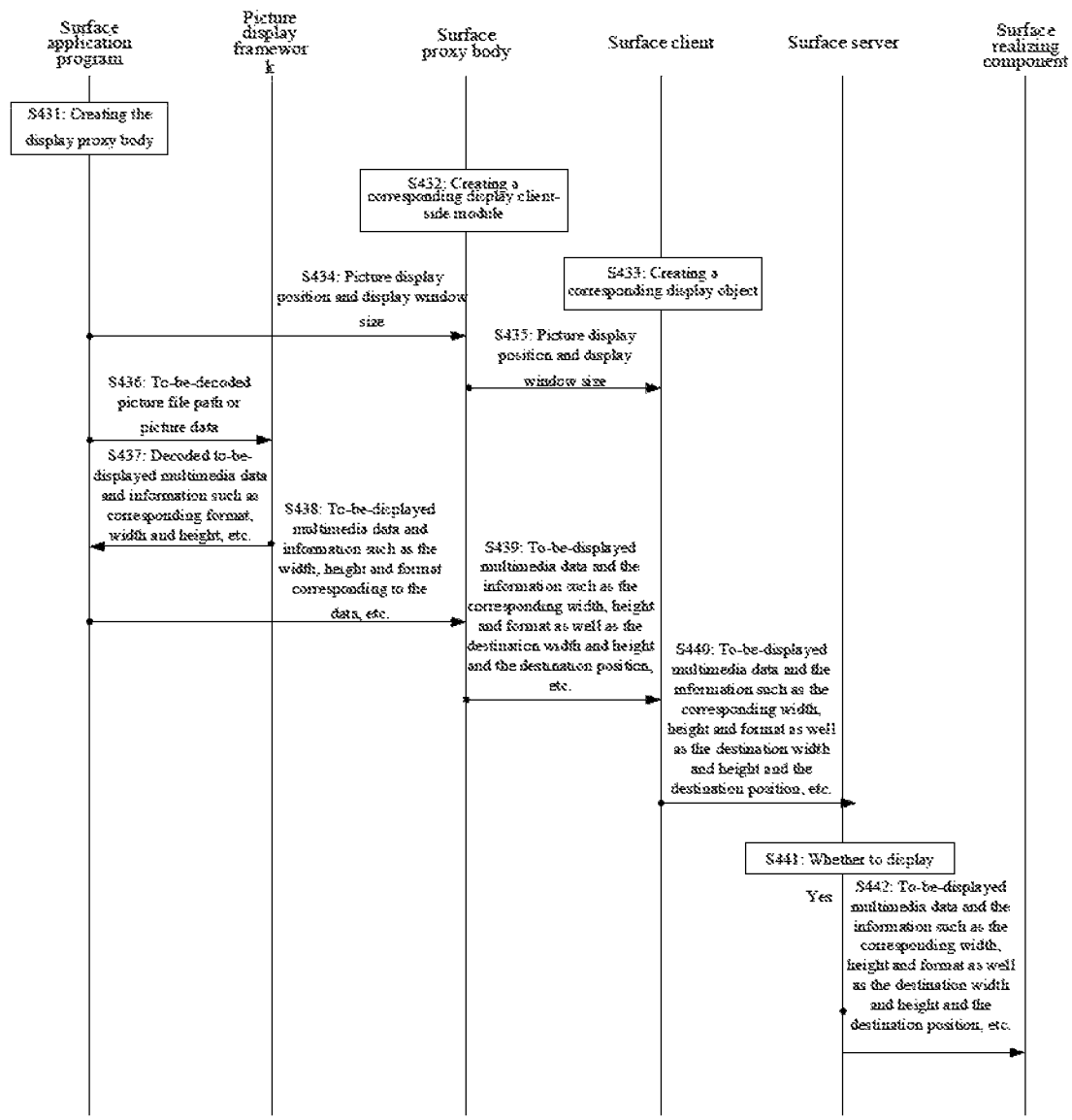
FIG. 24 is a schematic flowchart diagram in the case where the surface entrusting body is of a CS architecture and processes a control flow in a further specific embodiment of the proxy-pattern-based multimedia displaying method according to the present disclosure.

In the case where the surface entrusting body is the CS architecture and the object to be processed is the control flow, the displaying process is as shown in FIG. 24:

S431: creating the surface proxy body by the surface application program.

S432: creating a corresponding surface client by the surface proxy body.

S433: creating a corresponding surface object in the surface server by the surface client.

S434: setting the picture display position and the destination size to the surface proxy body by the surface application program.

S435: setting the picture display position and the destination size to the surface client by the surface proxy body.

S436: setting a to-be-decoded picture file path or picture data to the picture display framework by the surface application program.

S437: acquiring the decoded to-be-displayed multimedia data and information such as the format, width and height corresponding to the to-be-displayed multimedia data or the like from the picture display framework by the surface application program.

S438: sending the decoded to-be-displayed multimedia data and the information such as the width, height and format corresponding to the to-be-displayed multimedia data or the like to the surface proxy body by the surface application program.

S439: sending the decoded to-be-displayed multimedia data and the information such as the corresponding width, height and format as well as the destination width and height and the destination position or the like to the surface client by the surface proxy body.

S440: sending the decoded to-be-displayed multimedia data and the information such as the corresponding width, height and format as well as the destination width and height and the destination position or the like to the surface server by the surface client.

S441: determining whether to display by the surface server.

S442: if it is determined to display, then sending the decoded to-be-displayed multimedia data and the information such as the corresponding width, height and format as well as the destination width and height and the destination position or the like to the surface realizing component for display by the surface server.

Figure 25:
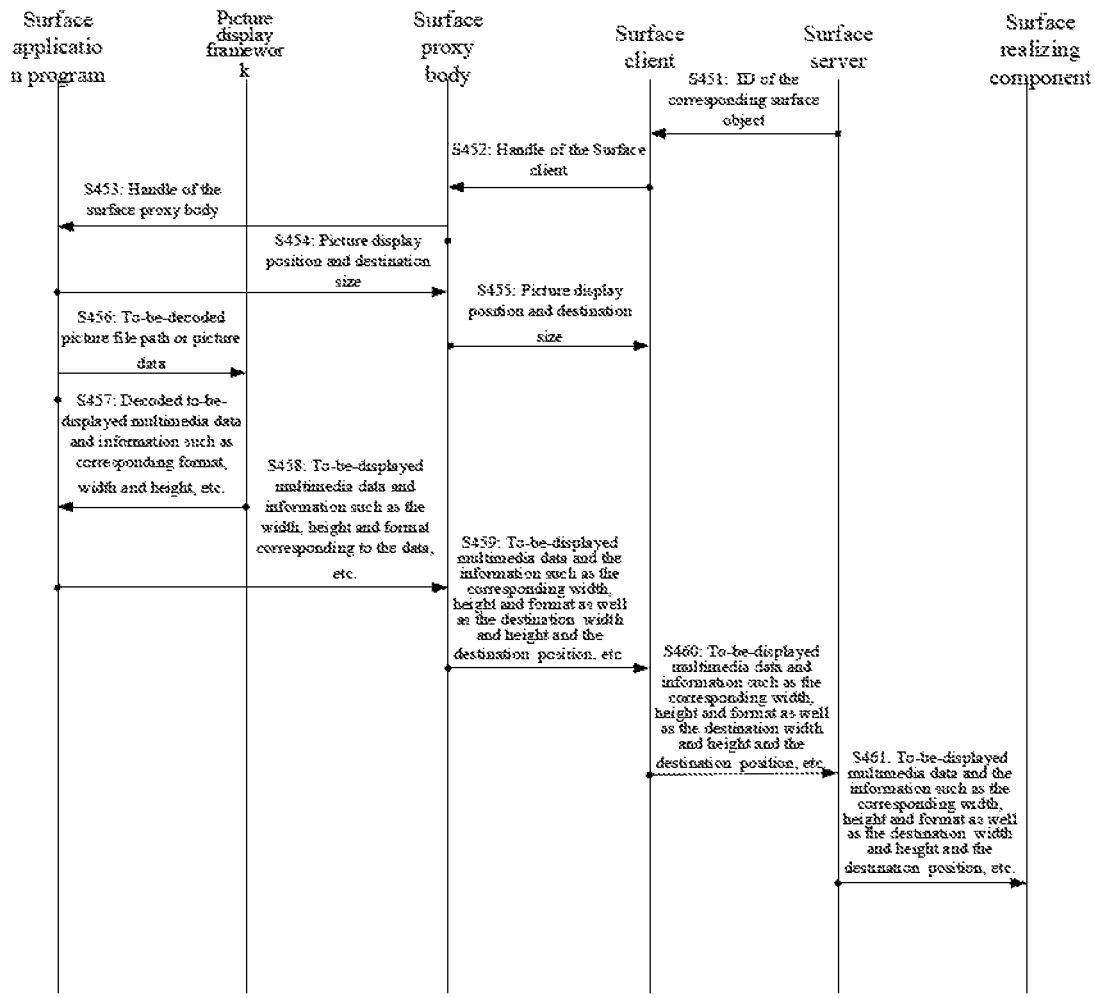
FIG. 25 is a schematic flowchart diagram in the case where the surface entrusting body is of a CS architecture and processes a data flow in a further specific embodiment of the proxy-pattern-based multimedia displaying method according to the present disclosure.

In the case where the surface entrusting body is the CS architecture and the object to be processed is the data flow, the displaying process is as shown in FIG. 25:

S451: sending the ID of the surface object corresponding to the surface client to the surface client by the surface server.

S452: sending a handle of the surface client to the surface proxy body by the surface client.

S453: sending the handle of the surface proxy body to the surface application program by the surface proxy body.

S454: setting the picture display position and the destination size to the surface proxy body by the surface application program.

S455: setting the picture display position and the destination size to the surface client by the surface proxy body.

S456: setting the to-be-decoded picture file path or picture data to the picture display framework by the surface application program.

S457: acquiring the decoded to-be-displayed multimedia data and information such as the format, width and height corresponding to the to-be-displayed multimedia data or the like from the picture display framework by the surface application program.

S458: sending the decoded to-be-displayed multimedia data and the information such as the width, height and format corresponding to the to-be-displayed multimedia data or the like to the surface proxy body by the surface application program.

S459: sending the decoded to-be-displayed multimedia data and the information such as the corresponding width, height and format as well as the destination width and height and the destination position or the like to the surface client by the surface proxy body.

S460: sending the decoded to-be-displayed multimedia data and the information such as the corresponding width, height and format as well as the destination width and height and the destination position or the like to the surface server by the surface client.

S461: sending the decoded to-be-displayed multimedia data and the information such as the corresponding width, height and format as well as the destination width and height and the destination position or the like to the surface realizing component for display by the surface server.

Figure 26:
FIG. 26 is a schematic structural view of an embodiment of a proxy-pattern-based multimedia displaying device according to the present disclosure.

As shown in FIG. 26, an embodiment of a proxy-pattern-based multimedia displaying device of the present disclosure is a chip where an embedded system is built in, the embedded system comprises a display application layer, a surface proxy body, a surface entrusting body and a surface realizing component, and the multimedia displaying device comprises:

a surface proxy body 51, being configured to receive to-be-displayed multimedia data from the display application layer and send the to-be-displayed multimedia data to a surface entrusting body 52; and the surface entrusting body 52, being configured to send the to-be-displayed multimedia data to the surface realizing component or the display application layer for display on a display screen.

The surface proxy body 51 is a proxy for the surface entrusting body 52, and the surface proxy body 51 and the surface entrusting body 52 are independent of the display application layer.

Optionally, the surface entrusting body 52 is of a non-CS architecture or a CS architecture. In case of the non-CS architecture, the surface entrusting body 52 comprises a surface realization which interfaces with the surface realizing component or the display application layer to realize the display function. In case of the CS architecture, the surface entrusting body 52 comprises a surface client and a surface server, and the surface server interfaces with the surface realizing component or the display application layer to realize the display function.

Optionally, the to-be-displayed multimedia data comprises at least one of decoded picture data, decoded video data and subtitle. The surface proxy body 51 is specifically configured to: acquire a output buffer from the surface entrusting body 52; send the output buffer to the display application layer so that the display application layer fills the output buffer with the to-be-displayed multimedia data; receive the filled buffer from the display application layer; and send the filled buffer to the surface realization or the surface client. If the surface entrusting body 52 is of the non-CS architecture, then the surface realization is specifically configured to: send the filled buffer to the surface realizing component so that the surface realizing component controls the display screen to display the to-be-displayed multimedia data. If the surface entrusting body 52 is of the CS architecture, then the surface client is specifically configured to send the filled buffer to the surface server; and the surface server is specifically configured to send the filled buffer to the surface realizing component so that the surface realizing component controls the display screen to display the to-be-displayed multimedia data.

Optionally, the to-be-displayed multimedia data comprises subtitle. The surface proxy body 51 is specifically configured to: acquire a output buffer from the surface entrusting body 52; send the output buffer to the display application layer so that the display application layer fills the output buffer with the subtitle; receive the filled buffer from the display application layer; and send the filled buffer to the surface realization or the surface client. If the surface entrusting body 52 is of the non-CS architecture, then the surface realization is specifically configured to call a function provided by the display application layer to plot the subtitle on the display screen. If the surface entrusting body 52 is of the CS architecture, then the surface client is specifically configured to send the filled buffer to the surface server; and the surface server is specifically configured to call a function provided by the display application layer to plot the subtitle on the display screen.

Optionally, the surface entrusting body 52 is of the CS architecture, the display application layer comprises at least one surface application program, each of the at least one surface application program corresponds to one surface proxy body 51 and one surface client respectively, each surface client corresponds to one surface object respectively in the surface server and the surface server manages the surface object.

If the number of the at least one surface application program is greater than one, then the surface server is specifically configured to: mix the to-be-displayed multimedia data from at least two of the surface application programs and then send the mixed to-be-displayed multimedia data to the surface realizing component; or determine whether the number of the display screen satisfies the displaying need of the surface application program, and if the determination result is that the number of the display screen does not satisfy the displaying need of the surface application program, then send the to-be-displayed multimedia data corresponding to part of the surface application programs to the surface realizing component; and if the determination result is that the number of the display screen satisfies the displaying need of the surface application program, then send all of the to-be-displayed multimedia data to the surface realizing component.

If the number of the display screen is greater than one, each of the display screens corresponds to one coverage object respectively in the surface realizing component; and the surface server is specifically configured to copy the to-be-displayed multimedia data and then send the copied to-be-displayed multimedia data to at least two of the coverage objects.

Optionally, the surface proxy body 51 is further configured to: receive from the display application layer a request of acquiring supported attribute information of the proxy entrusting body, the supported attribute information comprising a set of formats supported and/or a set of characters supported; forward the request of acquiring the supported attribute information of the proxy entrusting body to the surface entrusting body 52; and receive the supported attribute information from the surface entrusting body 52 and send the supported attribute information to the display application layer.

Optionally, the surface proxy body 51 is further configured to receive configuration information from the display application layer and send the configuration information to the surface entrusting body 52, and the configuration information comprises at least one of a selected format, resolution, buffer information, destination information and priority.

Figure 27:
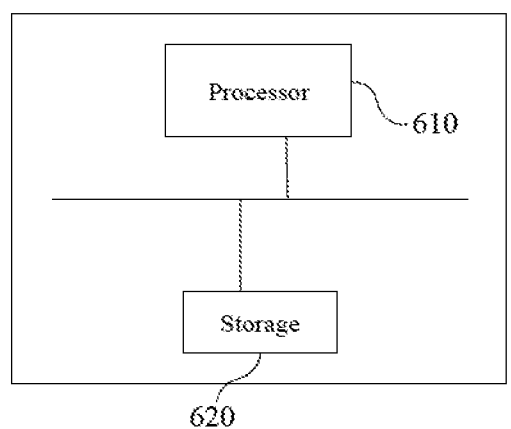
FIG. 27 is a schematic structural view of an embodiment of the proxy-pattern-based multimedia displaying apparatus according to the present disclosure.

As shown in FIG. 27, an embodiment of a proxy-pattern-based multimedia displaying apparatus of the present disclosure comprises a processor 610 and a storage 620, and the processor 610 is connected to the storage 620.

The storage 620 is configured to store instructions used for the operation of the processor 610.

The processor 610 controls the operation of the proxy-pattern-based multimedia displaying device, and the processor 610 may also be referred to as a central processing unit (CPU). The processor 610 may be an integrated circuit chip with the signal processing capability. The processor 610 may also be a universal processor, a digital signal processor (DSP), an application-specific integrated circuit (ASIC), a field programmable gate array (FPGA) or other programmable logic devices, a discrete gate or a transistor logic device and a discrete hardware component. The universal processor may be a microprocessor or the processor may be any conventional processor or the like.

The storage 620 is configured to store instructions used for the operation of the processor 610.

The processor 610 is configured to execute the instructions to accomplish the method provided in any one and any non-conflicting combination of the embodiments of the proxy-pattern-based multimedia displaying method according to the present disclosure.

Figure 28:
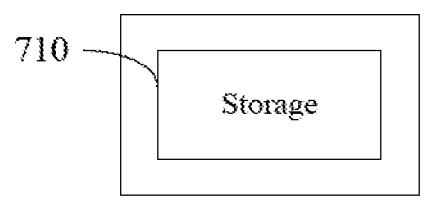
FIG. 28 is a schematic structural view of an embodiment of a readable storage medium according to the present disclosure.

As shown in FIG. 28, an embodiment of a readable storage medium of the present disclosure comprises a storage 710 having instructions stored thereon, and when the instructions are executed, the method provided in any one and any non-conflicting combination of the embodiments of the proxy-pattern-based multimedia displaying method according to the present disclosure is accomplished.

The storage 710 may comprise a read-only memory (ROM), a random access memory (RAM), a flash memory, a hard disk, a compact disk or the like.

It shall be appreciated that, methods and devices disclosed in the embodiments provided in the present disclosure may be accomplished in other ways. For example, the implementation of the device described above is only schematic, e.g., the division of the modules or units is only a division in terms of logic functions, but other dividing manners are possible in the practical implementation. For example, multiple units or components may be combined or integrated into another system, or some features may be ignored or not executed. Additionally, the coupling or direct coupling or communication connection between the components that are shown or discussed may be accomplished by some interfaces, and the indirect coupling or communication connection between devices or units may be electrical, mechanical or in other forms.

A unit that is illustrated as a separate part may be or may not be physically separated, and a part that is displayed as a unit may be or may not be a physical unit, i.e., the part may be located at one place or may be distributed over multiple network units. The objective of the solution of this implementation can be achieved by selecting part or all of the units depending on practical needs.

Moreover, the functional units in the embodiments of the present disclosure may be integrated into one processing unit, or each of the units exists separately as a physical unit, or two or more of the units are integrated into one unit. The integrated unit described above may be implemented in the form of hardware or may be implemented in the form of a software functional unit.

The integrated unit, if implemented in the form of a software functional unit and sold or used as an independent product, may be stored in one computer readable storage medium. Based on such understanding, the technical solution of the present disclosure may be substantially embodied in the form of a software product or part of the technical solution that contributes to the prior art or all or part of the technical solution may be embodied in the form of a software product. The computer software product is stored in one storage medium and comprises multiple instructions to enable a computer apparatus (which may be a personal computer, a server, or a network apparatus or the like) or a processor to execute all or part of the steps of the methods of the embodiments according to the present disclosure. the storage medium described above includes various mediums that are capable of storing program codes such as a USB flash disk, a mobile hard disk, a read-only memory (ROM), a random access memory (RAM), a magnetic disk or a compact disk or the like.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A proxy-pattern-based multimedia displaying method applied to a chip where an embedded system is built in, the embedded system comprising a display application layer, a surface proxy body, a surface entrusting body and a surface realizing component, wherein the surface proxy body is an proxy for the surface entrusting body and the surface proxy body and the surface entrusting body are independent of the display application layer; the multimedia displaying method comprising:
   receiving to-be-displayed multimedia data from the display application layer and sending the to-be-displayed multimedia data to the surface entrusting body by the surface proxy body; and
   sending the to-be-displayed multimedia data to the surface realizing component or the display application layer for display on a display screen by the surface entrusting body;
   wherein before the receiving to-be-displayed multimedia data from the display, application layer, the method further comprises:
   acquiring supported attribute information of the proxy entrusting body, wherein the supported attribute information comprises a set of formats supported and/or a set of characters supported;
   forwarding by the surface proxy body the request of acquiring the supported attribute information of the proxy entrusting body to the surface entrusting body;
   sending by the surface entrusting body the supported attribute information to the surface proxy body;
   sending by the surface proxy body the supported attribute information to the display application layer;
   receiving by the surface proxy body configuration information from the display application layer; and
   sending by the surface proxy body the configuration information to the surface entrusting body.

2. The method of claim 1, wherein the surface entrusting body is one of a non-CS architecture and a CS architecture;
   when the surface entrusting body is the non-CS architecture, the surface entrusting body comprising a surface realization which interfaces with one of the surface realizing component and the display application layer to realize a display function;
   when the surface entrusting body is the CS architecture, the surface entrusting body comprising a surface client and a surface server, and the surface server interfaces with one of the surface realizing component and the display application layer to realize the display function.

3. The method of claim 2, wherein the to-be-displayed multimedia data comprises at least one of decoded picture data, decoded video data and subtitle; the receiving to-be-displayed multimedia data from the display application layer and sending the to-be-displayed multimedia data to the surface entrusting body by the surface proxy body comprising:
   acquiring an output buffer from the surface entrusting body by the surface proxy body;
   sending the output buffer to the display application layer so that the display application layer fills the output buffer with the to-be-displayed multimedia data by the surface proxy body;
   receiving the filled buffer from the display application layer by the surface proxy body; and sending the filled buffer to one of the surface realization and the surface client by the surface proxy body.

4. The method of claim 3, wherein the to-be-displayed multimedia data comprises the subtitle in a text format, and the subtitle data in the filled buffer is subtitle in a picture format that has been converted by the display application layer.

5. The method of claim 3, wherein the surface entrusting body is the non-CS architecture, and the sending the to-be-displayed multimedia data to the surface realizing component for display on the display screen by the surface entrusting body comprises:
sending the filled buffer to the surface realizing component by the surface realization so that the surface realizing component controls the display screen to display the to-be-displayed multimedia data; or
the surface entrusting body is the CS architecture, and the sending the to-be-displayed multimedia data to surface realizing component for display on the display screen by the surface entrusting body comprises:
sending the filled buffer to the surface server by the surface client; and
sending the filled buffer to the surface realizing component by the surface server so that the surface realizing component controls the display screen to display the to-be-displayed multimedia data.

6. The method of claim 2, Wherein the to-be-displayed multimedia data comprises subtitle, the surface entrusting body is the non-CS architecture, and the receiving the to-be-displayed multimedia data from the display application layer and sending the to-be-displayed multimedia data to the surface entrusting body by the surface proxy body comprises:
acquiring an output buffer from the surface entrusting body by the surface proxy body;
sending the output buffer to the display application layer so that the display application layer fills the output buffer with the subtitle by the surface proxy body;
receiving the filled buffer from the display application layer by the surface proxy body; and
sending the filled buffer to the surface realization by the surface proxy body; and
the sending the to-be-displayed multimedia data to the display application layer for display on the display screen by the surface entrusting body comprises:
calling a function provided by the display application layer to plot the subtitle on the display screen by the surface realization.

7. The method of claim 2, wherein the to-be-displayed multimedia data comprises subtitle, the surface entrusting body is the CS architecture;
the receiving the to-be-displayed multimedia data from the display application layer and sending the to-be-displayed multimedia data to the surface entrusting body by the surface proxy body comprises:
acquiring an output buffer from the surface entrusting body by the surface proxy body;
sending the output buffer to the display application layer by the surface proxy body so that the display application layer fills the output buffer with the to-be-displayed multimedia data;
receiving the filled buffer from the display application layer by the surface proxy body; and
sending the filled buffer to the surface client by the surface proxy body; and the sending the to-be-displayed multimedia data to surface realizing component for display on the display screen by the surface entrusting body comprises:
sending the filled buffer to the surface server by the surface client; and
calling by the surface server a function provided by the display application layer to plot the subtitle on the display screen.

8. The method of claim 2, wherein the surface entrusting body is the CS architecture, the display application layer comprises at least one surface application program, each of the at least one surface application program corresponds to one said surface proxy body and one said surface client respectively, each said surface client corresponds to one surface object respectively in the surface server and the surface server manages the surface object.

9. The method of claim 8, wherein the number of the at least one surface application program is greater than one,
sending by the surface entrusting body the to-be-displayed multimedia data to the surface realizing component comprising:
mixing the to-be-displayed multimedia data from at least two of the surface application programs and then sending the mixed to-be-displayed multimedia data to the surface realizing component by the surface server; or
determining by the surface server whether the number of the display screen satisfies the displaying need of the surface application program; and when the determination result is that the number of the display screen does not satisfy the displaying need of the surface application program, then sending by the surface server the to-be-displayed multimedia data corresponding to part of the surface application programs to the surface realizing component, and when the determination result is that the number of the display screen satisfies the displaying need of the surface application program, then sending by the surface server all of the to-be-displayed multimedia data to the surface realizing component.

10. The method of claim 8, wherein the number of the display screen is greater than one, and each display screen corresponds to one coverage object respectively in the surface realizing component;
sending the to-be-displayed multimedia data to the surface realizing component by the surface entrusting body comprising:
copying the to-be-displayed multimedia data and then sending the copied to-be-displayed multimedia data to at least two of the coverage objects by the surface server.

11. The method of claim 1,
wherein the configuration information comprises at least one of a selected format, resolution, buffer information, destination information and priority.

12. A proxy-pattern-based multimedia displaying device belonged to a chip where an embedded system is built in, the embedded system comprising a display application layer, a surface proxy body, a surface entrusting body and a surface realizing component, wherein
the surface proxy body is configured to receive to-be-displayed multimedia data from the display application layer and send the to-be-displayed multimedia data to the surface entrusting body;
the surface entrusting body is, configured to send the to-be-displayed multimedia data to the surface realizing component or the display application layer for display on a display screen;

wherein the surface proxy body is an proxy for the surface entrusting body and the surface proxy body and the surface entrusting body are independent of the display application layer;

the surface proxy body is further configured to: receive from the display application layer a request of acquiring supported attribute information of the proxy entrusting body, the supported attribute information comprises a set of formats supported and/or a set of characters supported; forward the request of acquiring the supported attribute information of the proxy entrusting body to the surface entrusting body; and receive the supported attribute information from the surface entrusting body and send the supported attribute information to the display application layer; and the surface proxy body is further configured to receive configuration information from the display application layer and send the configuration information to the surface entrusting body.

13. The device of claim 12, wherein the surface entrusting body is one of a non-CS architecture and a CS architecture;

when the surface entrusting body is the non-CS architecture, the surface entrusting body comprising a surface realization which interfaces with one of the surface realizing component and the display application layer to realize a display function;

when the surface entrusting body is the CS architecture, the surface entrusting body comprising a surface client and a surface server, and the surface server interfaces with one of the surface realizing component and the display application layer to realize the display function.

14. The device of claim 13, wherein the to-be-displayed multimedia data comprising at least one of decoded picture data, decoded video data and subtitle;

the surface proxy body is configured to acquire a output buffer from the surface entrusting body; send the output buffer to the display application layer so that the display application layer fills the output buffer with the to-be-displayed multimedia data; receive the filled buffer from the display application layer; and s one of the surface realization and the surface client; and the surface entrusting body is the non-CS architecture, and the surface realization is configured to send the filled buffer to the surface realizing component so that the surface realizing component controls the display screen to display the to-be-displayed multimedia data; or the surface entrusting body is the CS architecture, the surface client is configured to send the filled buffer to the surface server; and the surface server is configured to send the filled buffer to the surface realizing component so that the surface realizing component controls the display screen to display the to-be-displayed multimedia data.

15. The device of claim 13, wherein the to-be-displayed multimedia data comprises subtitle;

the surface proxy body is configured to acquire a output buffer from the surface entrusting body; send the output buffer to the display application layer so that the display application layer fills the output buffer with the subtitle; receive the filled buffer from the display application layer; and send the filled buffer to the surface realization or the surface client;

the surface entrusting body is the non-CS architecture, and the surface realization is configured to call a function provided by the display application layer to plot the subtitle on the display screen; or the surface entrusting body is the CS architecture, and the surface client is configured to send the filled buffer to the surface server; and the surface server is configured to call a function provided by the display application layer to plot the subtitle on the display screen.

16. The device of claim 13, wherein the surface entrusting body is the CS architecture, the display application layer comprising at least one surface application program, each of the at least one surface application program corresponds to one said surface proxy body and one said surface client respectively, each said surface client corresponds to one surface object respectively in the surface server and the surface server manages the surface object.

17. The device of claim 16, wherein the number of the at least one surface application program is greater than one, and the surface server is configured to: mix the to-be-displayed multimedia data from at least two of the surface application programs and then send the mixed to-be-displayed multimedia data to the surface realizing component; or determine whether the number of the display screen satisfies the displaying need of the surface application program, and when the determination result is that the number of the display screen does not satisfy the displaying need of the surface application program, then send the to-be-displayed multimedia data corresponding to part of the surface application programs to the surface realizing component, and when the determination result is that the number of the display screen satisfies the displaying need of the surface application program, then send all of the to-be-displayed multimedia data to the surface realizing component.

18. The device of claim 16, wherein the number of the display screen is greater than one, and each of the display screens corresponds to one coverage object respectively in the surface realizing component; and the surface server is configured to copy the to-be-displayed multimedia data and then send the copied to-be-displayed multimedia data to at least two of the coverage objects.

19. A proxy-pattern-based multimedia displaying apparatus comprising a processor and a storage, the processor being connected to the storage and the storage having instructions stored therein;

the processor is configured to execute the instructions to accomplish a proxy-pattern-based multimedia displaying method applied to a chip where an embedded system is built in, the embedded system comprising a display application layer, a surface proxy body, a surface entrusting body and a surface realizing component, wherein the surface proxy body is an proxy for the surface entrusting body and the surface proxy body and the surface entrusting body are independent of the display application layer; the multimedia displaying method comprising:

receiving to-be-displayed multimedia data from the display application layer and sending the to-be-displayed multimedia data to the surface entrusting body by the surface proxy body; and sending the to-be-displayed multimedia data to the surface realizing component or the display application layer for display on a display screen by the surface entrusting body;

wherein before the receiving to-be-displayed multimedia data from the display application layer, the method further comprises:

acquiring supported attribute information of the proxy entrusting body, wherein the supported attribute information comprises a set of formats supported and/or a set of characters supported;

forwarding by the surface proxy body the request of acquiring the supported attribute information of the proxy entrusting body to the surface entrusting body;

sending by the surface entrusting body the supported attribute information to the surface proxy body;

sending by the surface proxy body the supported attribute information to the display application layer;

receiving by the surface proxy body configuration information from the display application layer; and sending by the surface proxy body the configuration information to the surface entrusting body.

* * * * *